(12) United States Patent
Williams et al.

(10) Patent No.: US 11,460,079 B2
(45) Date of Patent: Oct. 4, 2022

(54) ANTI-BACK DRIVE COMPONENTS FOR A VALVE ACTUATOR ASSEMBLY

(71) Applicant: TRI-TEC MANUFACTURING, LLC, Kent, WA (US)

(72) Inventors: Michael Douglas Williams, Kent, WA (US); Mark Scott Soldan, Tacoma, WA (US); Donald Hoban, Edgewood, WA (US); Matt Todd Buss, Kent, WA (US)

(73) Assignee: TRI-TEC MANUFACTURING, LLC, Kent, WA (US)

( * ) Notice: Subject to any disclaimer, the term of this patent is extended or adjusted under 35 U.S.C. 154(b) by 305 days.

(21) Appl. No.: 16/812,122

(22) Filed: Mar. 6, 2020

(65) Prior Publication Data
US 2020/0284307 A1 Sep. 10, 2020

Related U.S. Application Data

(60) Provisional application No. 62/815,107, filed on Mar. 7, 2019.

(51) Int. Cl.
| | |
|---|---|
| *F16D 43/20* | (2006.01) |
| *F16D 43/208* | (2006.01) |
| *F16K 31/60* | (2006.01) |
| *F16D 43/21* | (2006.01) |
| *F16K 31/05* | (2006.01) |
| *F16D 41/06* | (2006.01) |

(52) U.S. Cl.
CPC .......... *F16D 43/208* (2013.01); *F16D 43/211* (2013.01); *F16K 31/60* (2013.01); *F16D 2041/0605* (2013.01); *F16D 2041/0606* (2013.01); *F16K 31/055* (2013.01)

(58) Field of Classification Search
CPC ................... F16D 43/20; F16D 43/211; F16D 2041/0605; F16K 31/60; F16K 31/055
See application file for complete search history.

(56) References Cited

U.S. PATENT DOCUMENTS

| | | | | | |
|---|---|---|---|---|---|
| 3,831,724 | A | * | 8/1974 | Baer | ........................ F16D 3/68 |
| | | | | | 192/56.51 |
| 5,695,031 | A | * | 12/1997 | Kurita | .................. F16D 41/067 |
| | | | | | 188/82.84 |
| 8,342,478 | B1 | | 1/2013 | Cordray et al. | |
| 10,001,178 | B2 | * | 6/2018 | Iwano | ..................... F16D 15/00 |
| 2002/0101106 | A1 | * | 8/2002 | Kim | ....................... B64D 11/06 |
| | | | | | 297/362.11 |

* cited by examiner

*Primary Examiner* — Huan Le
(74) *Attorney, Agent, or Firm* — Seed IP Law Group LLP

(57) ABSTRACT

Valve systems include a valve and a valve actuator assembly for operating the valve. The valve actuator assembly includes a drive device and a hand wheel assembly that can independently be used to cause movement of the valve. An anti-back drive component is coupled to the output of the drive device, the hand wheel assembly, or both. The anti-back drive component includes a locking device and an unlocking device, each with respective protrusions that cooperate to define cavities that house pairs of springs and rollers. The shape and orientation of the cavities allows for rotation of the rollers in the cavities and the anti-back drive component by rotating the unlocking device, while preventing rotation of the rollers and the anti-back drive component via rotation of the locking device to selectively prevent rotation of the output of the drive device, hand wheel assembly, or both.

20 Claims, 13 Drawing Sheets

ANTI-BACK DRIVE COMPONENTS FOR A VALVE ACTUATOR ASSEMBLY

BACKGROUND

Technical Field

The present disclosure generally relates to valve actuator assemblies, and more particularly, to valve actuator assemblies that include one or more anti-back drive components.

Description of the Related Art

Valve actuators are often used to open and close valves positioned along pipes. Electric valve actuators can be used in a wide range of settings, including in waste water treatment plants, refineries, power plants, factories, and transportation vehicles, such as watercraft. Based on the ambient environment, components of electric valve actuators can be corrosion resistant, temperature resistant, explosion resistant, and/or resistant to other environmental conditions.

Electric valve actuators often include an electric motor and a rotatable hand wheel assembly that can operate independently of the electric motor. When the motor is energized, the valve actuator can automatically operate the valve. During a power failure or motor malfunction, an individual can rotate the hand wheel assembly to operate the valve. Thus, conventional electric valve actuators can manually or automatically operate a valve.

One issue with known valve actuators is that the electric motor can drive the hand wheel assembly or the hand wheel assembly can drive the electric motor, which can reduce operational efficiency and the useful life of the respective components. To address this problem, certain devices are known for deactivating the hand wheel assembly when the motor is energized and vice versa. For example, a valve actuator assembly may include a hand wheel assembly coupled to a gear train for operating the valve, wherein the gear train disengages with the hand wheel assembly when the motor is energized. However, such systems for disengaging the gear train are often associated with high risks of failure.

Alternatively, the hand wheel may include a locking assembly to prevent the motor from turning the hand wheel during use, but such locking assemblies are also known to be unreliable and inefficient. For example, such locking assemblies typically utilize a high gear ratio, which reduces operational speeds for the valve according to known principles, or a clamping device, which requires operator action to engage and disengage. Moreover, failure of these systems results in significant safety issues, such as a valve that cannot be opened or closed, or that automatically opens when it should be closed. As another example, if the deactivation system associated with the hand wheel fails, the hand wheel may spin uncontrollably due to the mechanical connection between the hand wheel and the motor output via the drive train, which increases occupational risk for personnel near the valve actuator.

BRIEF SUMMARY

The present disclosure is generally directed to valve systems that include a valve and a valve actuator assembly. The valve actuator assembly includes a drive device (e.g., an electric motor) and a hand wheel assembly for causing movement of a valve coupled or connected to the valve actuator assembly. An anti-back drive component is coupled to the output of the drive device, the hand wheel assembly, or both. Such an anti-back drive component allows forces to be transmitted (e.g., rotational forces) from a first component (e.g., a drive shaft) to a second component (e.g., an output of an actuator) with a minimal level of resistance, but does not allow forces from the second component to be transmitted to the first component. In other words, rotational force (e.g., clockwise or counterclockwise) applied to a first component may be transferred to a second component causing the second component to rotate, but if rotational force is applied to the second component, the anti-back drive component prevents the rotation of the first component.

The valve actuator assembly may not be physically coupled directly to the valve. For example, another component for transmitting forces can couple the valve actuator assembly to the valve. The anti-back drive components may prevent the transmission of forces from the drive device to the hand wheel assembly, from the hand wheel assembly to the drive device, or directly to the drive device or hand wheel assembly from the valve.

As described in further detail below, an anti-back drive component includes an unlocking device coupled to a locking device. Roller and spring pairs are received in respective channels of the unlocking device and the locking device, such that the rollers and springs are arranged between a surface of the unlocking device and a surface of the locking device. When the locking device rotates about its axis, the shape and angular orientation of the channels of the locking device force the springs away from the axis, which pushes the pins into the channels of the unlocking device to generate friction that prevents rotation of the entire anti-back drive component. On the other hand, when the unlocking device rotates about its axis, the shape and angular orientation of the channels of the unlocking device moves the springs toward the axis to a position relative to the channels of the locking device such that the rollers can rotate in place without leaving the channels of the locking device, which allows the entire anti-back drive component to rotate.

BRIEF DESCRIPTION OF THE SEVERAL VIEWS OF THE DRAWINGS

For a better understanding of the embodiments, reference will now be made by way of example to the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be enlarged and positioned to improve drawing legibility.

DETAILED DESCRIPTION

Figure 1:
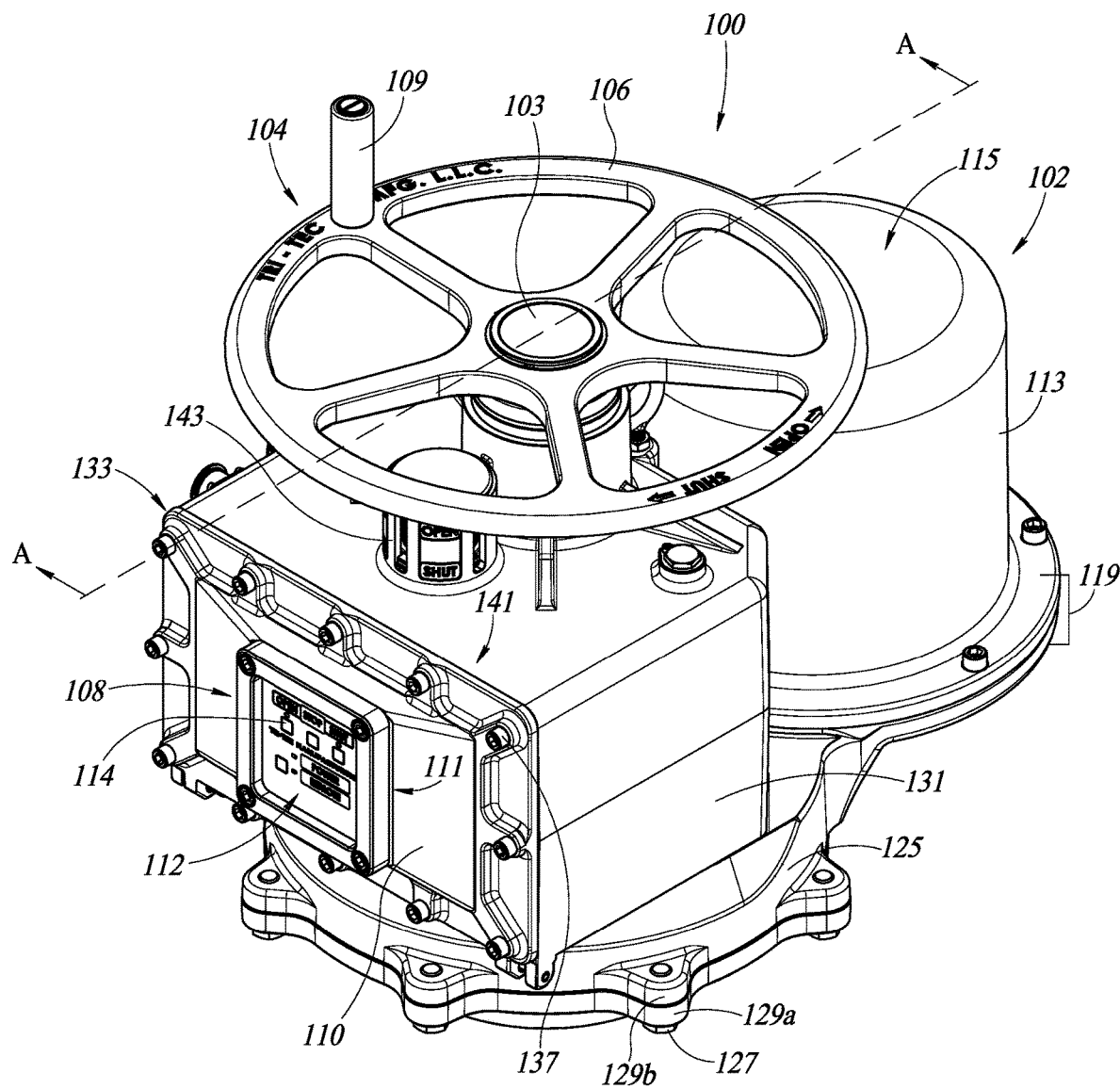
FIG. 1 is a top perspective view of an embodiment of a valve actuator assembly according to the present disclosure.

The present disclosure is generally directed to valve systems including a valve and a valve actuator assembly that includes a drive device (e.g., an electric motor) and a hand wheel assembly that can independently be used to cause movement of the valve. An anti-back drive component is coupled to the output of the drive device, the hand wheel assembly, or both. The anti-back drive component selectively prevents rotation of the output of the drive device, hand wheel assembly, or both, as described herein.

A valve actuator assembly 100 is shown in FIGS. 1-5. The valve actuator assembly 100 includes a drive device 102, which, in a preferred embodiment, is electrically powered, but which may also be hydraulic or pneumatic, and a hand wheel assembly 104. The hand wheel assembly 104 allows for operation of a valve connected to the valve actuator assembly 100 without employing the drive device 102. In this embodiment, the hand wheel assembly 104 may be used to operate the valve during an electrical power outage. In such circumstances, a hand wheel 106 of the hand wheel assembly 104 can be rotated clockwise to close the valve and rotated counterclockwise to open the valve, or vice versa, depending on the configuration of the hand wheel assembly 104. In the illustrated embodiment, the hand wheel assembly 104 includes hand wheel 106 and handle 109. The hand wheel 106 and the handle 109 can be used to generate torque on the hand wheel assembly 104 in order to operate the valve connected to the valve actuator assembly.

In one or more embodiments, the hand wheel 106 of the hand wheel assembly 104 may be interchangeable with hand wheels of different sizes. For example, for smaller valve actuators 100, a smaller hand wheel may be used and for larger actuators, a larger hand wheel may be used. As such, a size of the hand wheel 106 may be selected by the user depending on the torque to manually open and close a valve associated with the valve actuator 100 or environmental constraints in which the valve actuator is to be installed. For example, in an embodiment, a fastener 103 coupling the hand wheel 106 to the valve actuator assembly 100 is loosened, and the hand wheel 106 is removed and replaced with a secondary hand wheel (e.g., a smaller or larger hand wheel than hand wheel 106) and the fastener, or a second fastener, is tightened to secure the secondary hand wheel.

The drive device 102 is housed in a cylindrical housing 113 having a first end 115 and a second end 117 opposite to the first end 115. The first end 115 coupled to the second end 117 through a coupling 119 that securely seals internal electronic components to avoid moisture damage, among other things.

Figure 4:
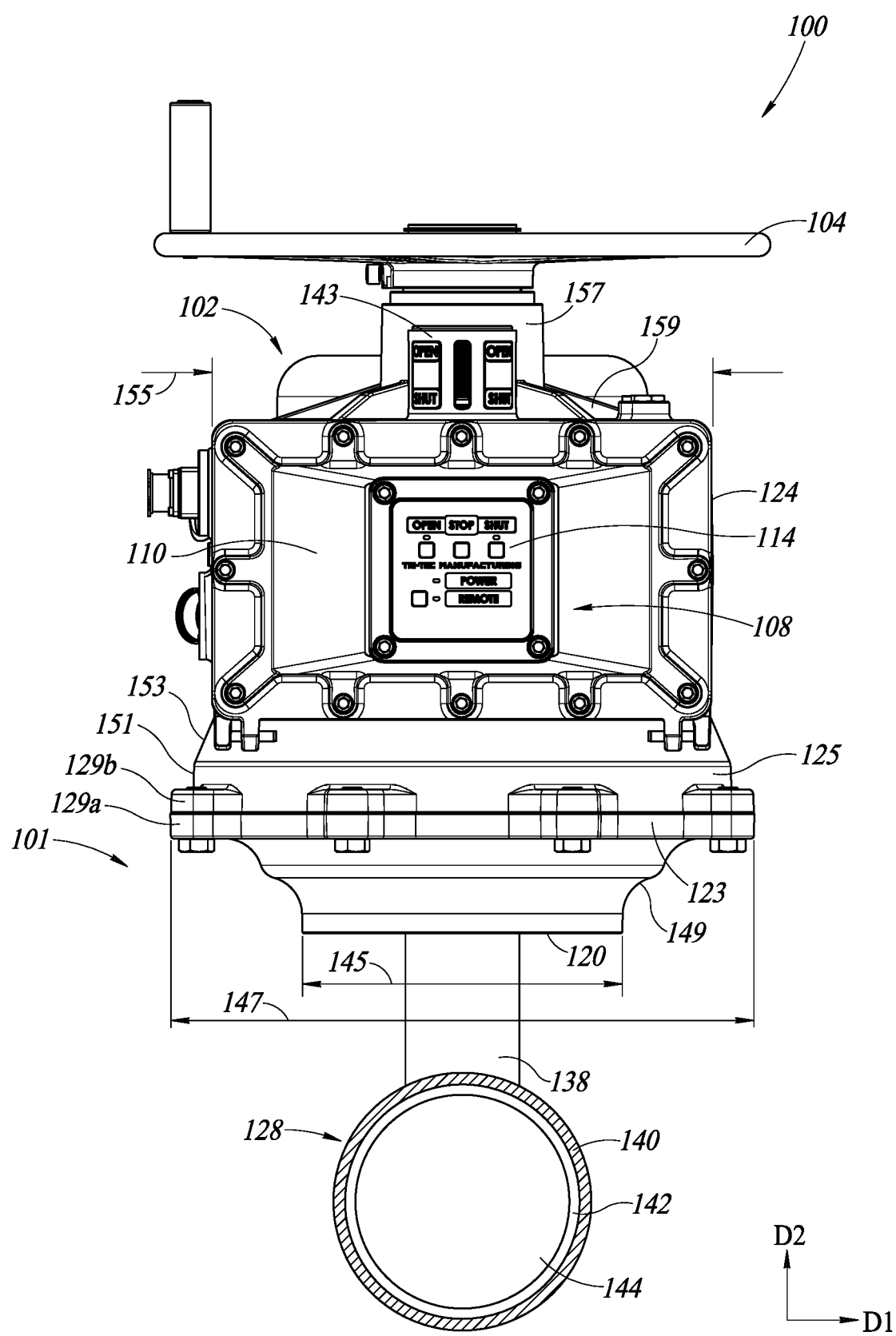
FIG. 4 is a front elevational view of the valve actuator assembly of FIG. 1 coupled to a valve.

As shown in FIGS. 1 and 4, the valve actuator assembly 100 includes a controller 108 in a housing 110 for automatically controlling the operation of the valve, as described herein. In some embodiments, a connector extends from the housing 110 for reading, transmitting, and receiving data via direct electrical connection between the controller 108 and an external device, such as a computer, processor, network, or other suitable central processing unit. In some embodiments, the controller 108 communicates with an external device through one or more wireless communication protocols such as Wi-Fi or Bluetooth®, among others. The controller 108 includes a display 112 and input device or interface 114, illustrated as an input or key pad, on a front surface 111 of the controller 108. The input device 114 can include one or more buttons, keyboards, touch pads, control modules, or peripheral devices for user input, such as for initiating a control sequence associated with opening and closing the valve associated with the valve actuator assembly 100. Moreover, the controller 108 can include various lights, such as those powered by light emitting diodes, among others, for indicating a status of the controller 108 and the valve actuator assembly 100, to a user.

The housing 110 is generally rectangular in shape. In one embodiment, the housing includes a solid box 131 having an open end 133. The valve actuator is assembled in the box 131 from the open end 133. A face plate 135 supports the display 112 and input device 114. Fasteners 137 couple the face plate 135 to the box 131 to achieve a watertight seal.

In yet further embodiments, the controller 108 is located external to the valve actuator assembly 100 (e.g., located remote from a motor, gearing, hand wheel, or other components of the valve actuator assembly 100) and electrically and communicatively coupled to the valve actuator assembly 100 by wires or through wireless transmission protocols, such as Wi-Fi® or Bluetooth® protocols, for example.

The controller 108 will generally include and as further referenced below, one or more central processing units, processing devices, microprocessors, digital signal processors (DSP), application specific integrated circuits (ASIC), readers, and the like. To store information, the controller 108 can also include one or more storage elements, such as volatile memory, non-volatile memory, read-only memory (ROM), random access memory (RAM), and the like. The storage elements can be coupled to the controller 108 by one or more busses. Example displays include LCD screens, LED or OLED screens, monitors, analog displays, digital displays (e.g., light emitting diode displayers), touch screen displays, or other devices suitable for displaying information.

The term "information" is used broadly to include, unless the context clearly dictates otherwise, one or more programs, executable code or instructions, routines, relationships (e.g., torque versus displacement curves, sensor signals versus valve positions, etc.), data, operating instructions, and the like, or combinations thereof. For example, information may include one or more torque settings (or other force settings) suitable for opening and closing valves of various sizes and operational requirements. In some embodiments, information can be transmitted between valve actuator assemblies, between an installed controller and a replacement controller, between a controller and a computer, across a network, and the like. Such communication may be accomplished via direct, wired connections or wirelessly, such as through use of Wi-Fi® or Bluetooth® transmission protocols and antennas, receivers, transceivers, and the like, corresponding to the same.

The valve actuator assembly 100 is suitable for use in a range of different environments, including non-corrosive environments, corrosive environments, magnetic environments, non-magnetic environments, moist environments, marine environments, or combinations thereof, and as such, the valve actuator assembly 100 may be formed from a variety of different metals, which may have the above properties, or the valve actuator assembly 100 may coated with one or more coatings to achieve performance in the above conditions. Marine environments are especially harsh because of the abundance of moisture and corrosive substances, such as salt water. The compact and robust valve actuator assembly 100 is especially well suited for use in ocean liners, ships, including military ships and submarines with limited mounting space for a valve system. In some embodiments, the valve actuator assembly 100 may be used in civilian or military watercraft (e.g., floating vessels, boats, ships, submergible vehicles such as submarines, and the like).

The illustrated valve actuator assembly 100, which may be a marine valve actuator assembly, can be submerged for an extended length of time (i.e. at least 10 minutes, at least 30 minutes, or more than an hour in various embodiments) without appreciably compromising performance, damaging internal components, and the like. For example, in an embodiment, the valve actuator assembly 100 includes hermetic or watertight seals, or both, at the couplings between components of the valve actuator assembly 100, such as through the use of gaskets, although the same can be accomplished without using gaskets in other embodiments. Various components of the valve actuator assembly 100 can be modified or removed based on the surrounding environment, if needed or desired.

Figure 2:
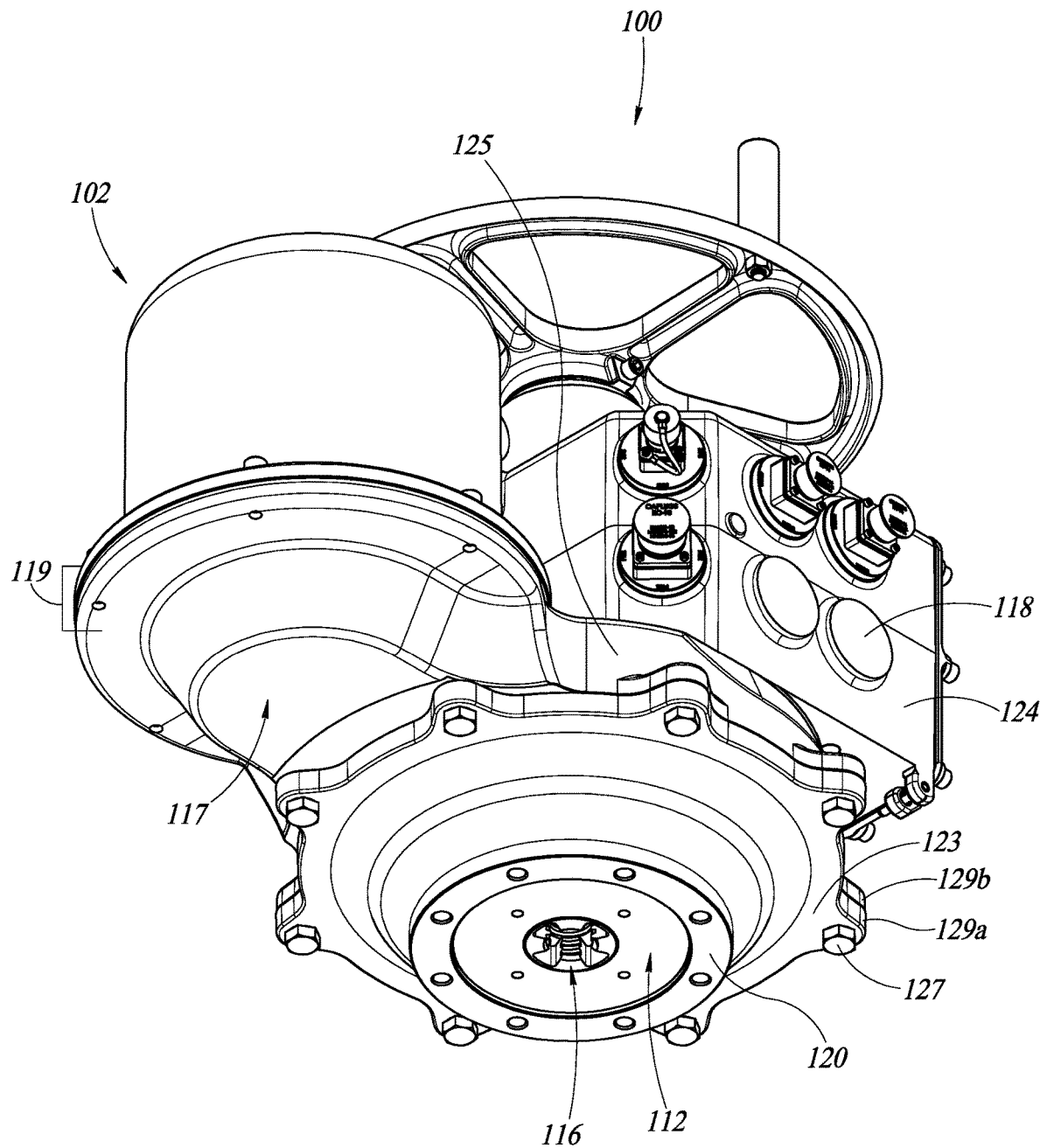
FIG. 2 is a bottom perspective view of the valve actuator assembly of FIG. 1.

FIG. 2 is a bottom perspective view of the valve actuator assembly of FIG. 1 having a mounting assembly 120 of the valve actuator assembly 100, which can be used to fixedly or removably couple the valve actuator assembly 100 to a valve, among other external structures. The mounting assembly 120 can include one or more bearings, output shafts, chucks, couplers, split rings, clamps, brackets, set screws, fasteners, pins, and the like to facilitate the temporary or permanent coupling of the valve actuator assembly 100 to an external structure, such as a valve, connector, or support. The valve actuator assembly 100, and more specifically, the mounting assembly 120, further includes an output 116, which may be a gear, a series of ribs and channels, teeth, splines, or other like structures. The output 116 is connected to the drive train of the valve actuator assembly 100 and the valve, as described herein, in order to transfer force and torque from the valve actuator assembly 100 to the valve or other external structure via rotation of the output 116 about its axis.

The output 116 is part of a round plate 123 that has a smallest dimension around the output 116 and a largest dimension where the plate 123 couples to a base 125 that supports both the drive device 102 and the housing 110. The base 125 is securely coupled to the plate 123 with fasteners 127. Each of the base 125 and the plate 123 include a plurality of radially positioned extensions 129a, 129b.

Also shown in FIG. 2 the main body 124 of the valve actuator assembly 100 houses and protects moving internal components that produce the force or torque that rotates the output 116 to, in turn, rotate a valve or other structure connected to the output 116. In some embodiments, the rotation of the output 116 causes a valve to be opened or closed by raising or lowering the stem, which is connected to the valve member of the valve. In such embodiments, the valve may be a guillotine valve or a knife gate valve, wherein raising or lower the stem raises or lowers a valve member with respect to a valve housing with an aperture therethrough that corresponds to a size and a shape of the valve member. For example, in a closed configuration, the valve stem is lowered such that the valve member blocks fluid from flowing through the aperture. In an open configuration, the valve stem is raised, which translates the valve member along a linear axis to allow fluid to flow through the aperture.

On a surface 141 of the box 131, an indicator 143 provides an indication of the current status of the valve, i.e. open or shut. This indicator 143 is cylindrical and integrally formed with the surface 141. However, other shapes, locations and orientations are envisioned.

The main body 124 further includes a plurality of inputs 118, which may be used to connect the valve actuator assembly 100 to various external structures or components within a fluid system. For example, in an embodiment, one of the plurality of inputs 118 transmits power to the valve actuator assembly 100, and more specifically, to the drive device 102 and the controller 108 in embodiments where the drive device 102 is an electric motor. Still further, a different one of the plurality of inputs 118 may establish an electrical or communicative connection between the valve actuator assembly 100 and other actuators or controllers within a system. In yet further embodiments, various sensors, such as temperature, water, or humidity sensors may be coupled to the one of the inputs and in electronic communication, either wired or wirelessly, with the controller 108 in order to provide sensor readings regarding the internal or external conditions of the valve actuator assembly 100. In an embodiment where the drive device 102 is a pneumatic or hydraulic valve actuator, one or more of the plurality of inputs 118 may be used to facilitate a connection with various hydraulic or pneumatic lines to provide pressurized fluid, such as air, gas, or hydraulic fluids, to the drive device 102.

Figure 3:
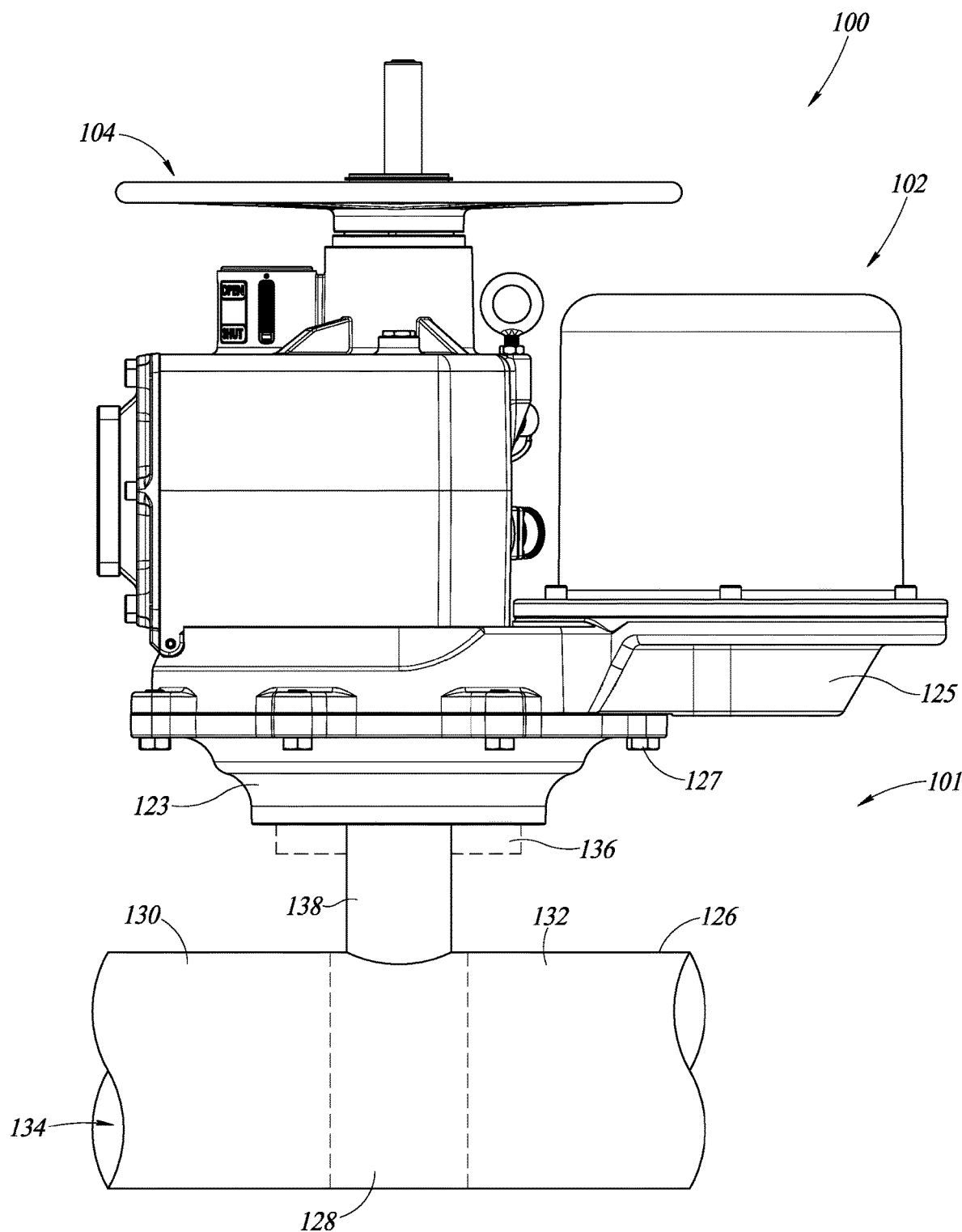
FIG. 3 is a side elevational view of the valve actuator assembly of FIG. 1 coupled to a valve.

Turning to FIG. 3, a side elevational view of the valve actuator assembly of FIG. 1 coupled to a valve is presented. The valve actuator assembly 100 is generally coupled to a valve 128 that is positioned between two sections 130, 132 of a conduit 126 via connector 138 to form a valve assembly or valve system 101. The valve actuator assembly 100 operates the valve 128, which in turn regulates the flow of substances through the conduit 126. For example, the valve actuator assembly 100 opens the valve 128 to allow fluid flow along a passageway 134 of the conduit 126. To halt the fluid flow along the passageway 134, the valve actuator assembly 100 closes the valve 128. As described above, opening or closing the valve 128 can be accomplished manually via the hand wheel assembly 104 or automatically via the drive device 102. In addition, FIG. 3 illustrates that the valve actuator assembly 100 is coupled to a support structure 136, which in conjunction with the connector 138, resists various axial, rotational, vibrational, or torsional forces, among others.

The connector 138 is physically and mechanically coupled to the output 116 of the valve actuator assembly 100, such that rotation of the output 116 results in rotation of an inner shaft of the connector 138, which in turn rotates the valve 128, which is mechanically coupled to the inner rotating shaft of the connector 138. Such mechanical couplings can be accomplished via gears, teeth, ribs and channels, splines, or other similar structures (e.g., splines on an outer surface of the inner rotating rod have a size and shape to interconnect, intermesh, or interlace with splines of the output 116 of the valve actuator assembly 100, etc.). In other embodiments where the valve 128 is a knife gate valve or a guillotine valve, for example, rotation of the output 116 raises or lowers the inner rotating shaft of the connector 138 relative to the output 116 in order to move a valve member along a linear axis, as described above. For example, in the illustrated embodiment, rotation of the output 116 clockwise may result in, due to the mechanical coupling of the output 116 and the inner rotating shaft, rotation and translation of the shaft in a generally upward or outward direction, which causes the valve member to move to an open position. Conversely, rotation of the output 116 counterclockwise may have the opposite effect, which forces the valve member to the closed position.

FIG. 4 illustrates additional details of the valve 128. The illustrated valve 128 is in the form of a butterfly valve and includes the connector 138 that extends between a valve housing 140 and the mounting assembly 120 of the valve actuator assembly 100. The valve 128 includes the valve housing 140, a sealing member 142 carried by the valve housing 140 and a valve member 144, illustrated as a generally circular disk, moveable between a closed position, as illustrated, and an open position, wherein the valve member 144 is rotated 90 degrees in either direction about a vertical axis through a center of the valve member 144 and the connector 138. When the valve member 144 is in the closed position, a seal, in most embodiments, a fluid tight seal, or in other embodiments, a hermetic and fluid tight seal, is formed by the valve member 144 and the sealing member 142. When the valve member 144 is in the open position, substances can flow through openings between the valve member 144 and the valve housing 140. The mounting assembly 120 has a dimension 145 in a first direction D1 that is associated with a diameter of the mounting assembly 120. The plate 123 that is coupled to the mounting assembly 120 has a dimension 147 in the first direction that extends between outermost edges of the extensions 129a. A wall or surface 149 extends between the mounting assembly 120 and the plate 123. The wall increases in dimension from the mounting assembly to the plate.

The base 125 includes a first portion 151 that extends in a second direction D2 that is transverse to the first direction D1 away from the extensions 129b. A second portion 153 couples to the housing 110. The second portion 153 extends from the first portion 151 to the housing at an angle. The housing 110 has a dimension 155 in the first direction that is less than the dimension 147.

The hand wheel assembly 104 is centrally coupled to the housing along the first direction D1. The hand wheel assembly includes the hand wheel 106 that includes a shaft in a cylindrical housing 157. There are a plurality of supports 159 that couple the housing 157 to the surface 141 of the housing 110. These supports 159 are larger closer to the housing 157 and smaller as they extend away from the housing 157. The supports 159 may be welded to the surface 141 of the housing 110 or may be integrally formed with the housing 110 and the housing 157.

In one embodiment, the indicator 143 is centrally positioned along the first direction. The indicator is positioned closer to the interface 114 than the housing 157. The indicator has a smaller dimension in the first direction than the housing 157.

In an embodiment, the valve system 101 may include one or more sensors to evaluate operation of the valve 128. In some embodiments, a sensor is mounted or adjacent to the connector 138 and is communicatively coupled to the controller 108, as described in U.S. Pat. No. 8,342,478, the entirety of which is incorporated herein by reference. In other embodiments, the sensor can be incorporated into the main body 124, the mounting assembly 120, the connector 138 or any other suitable component or subassembly of the valve system 101.

Preferably, the sensor is capable of sensing various different operating features and forces present during operation of the valve 128. In one embodiment, the sensor is an angular position sensor that detects and sends one or more signals indicative of the angular position of the valve member 144. In other embodiments, the sensor also detects the amount of force applied to the valve 128 via connector 138 by the drive device 102. The sensor can detect the torque applied to the connector 138 to cease rotation of the valve 128 and also detect the position of the valve 128 while the torque is being applied. In some embodiments, various forces, such as lateral forces, axial forces, sealing forces, the force applied to the connector 138 at or by the drive device 102, as well as the force the connector 138 applies to the valve 128 may be detected.

A common issue in such a valve system 101 is that, because the drive device 102 and the hand wheel assembly 104 are both configured to operate the valve 128, it is desirable to prevent the force created by the drive device 102 or the hand wheel assembly 104 from acting on each other. In other words, it is desirable that when the drive device 102 is operating the valve 124, the force created by the drive device 102 is not also causing the hand wheel 106 of hand wheel assembly 104 to turn. Similarly, it is desirable that when the hand wheel assembly 104 is operating the valve 128, the force created by the hand wheel assembly 104 is not also causing a portion of the drive device 102 to turn. This is advantageous for several reasons. For example, if the hand wheel assembly 104 is spinning because of the drive device 102, it creates an occupational safety hazard to personnel in the area. Further, if both the hand wheel assembly 104 and the drive device 102 are allowed to rotate, it may hinder (e.g., reduce the speed or efficiency) a user's efforts to open and close the valve 128, which creates immediate concerns regarding operability and safety. Additionally, if both the hand wheel assembly 104 and the drive device 102 can simultaneously rotate, it may allow the valve 128 to open without input from the hand wheel assembly 104 or the drive device 102. This is especially a concern in situations where high pressure forces are acting on the valve member 144 when the valve 128 is closed, which is a safety and operational risk, as it may be important at various times to ensure that the valve 128 remains closed.

Figure 5:
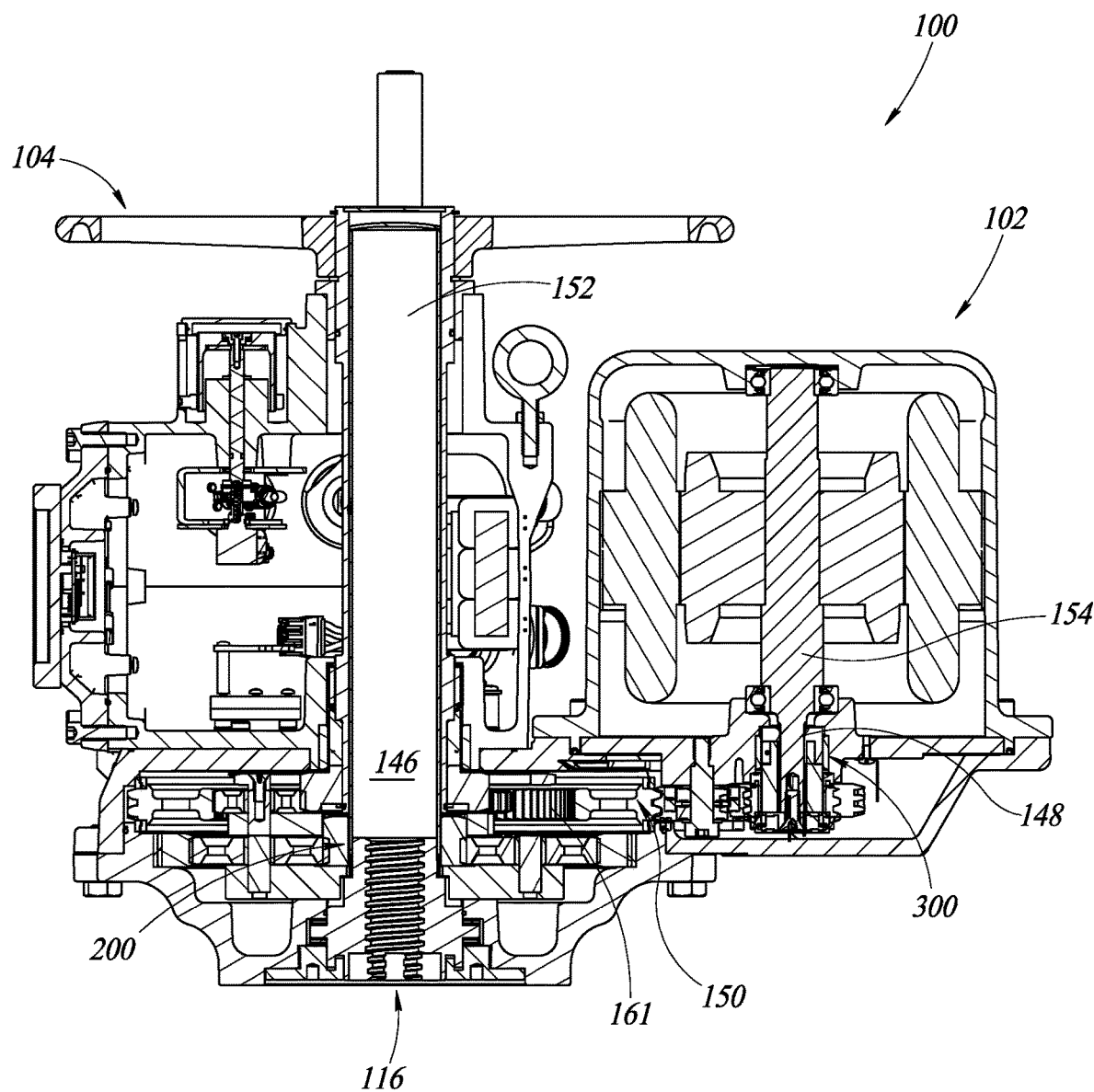
FIG. 5 is a cross-sectional view along line A-A of the valve actuator assembly of FIG. 1 showing an embodiment of an anti-back drive component coupled to a drive unit of the valve actuator assembly according to the present disclosure.
Figure 6:
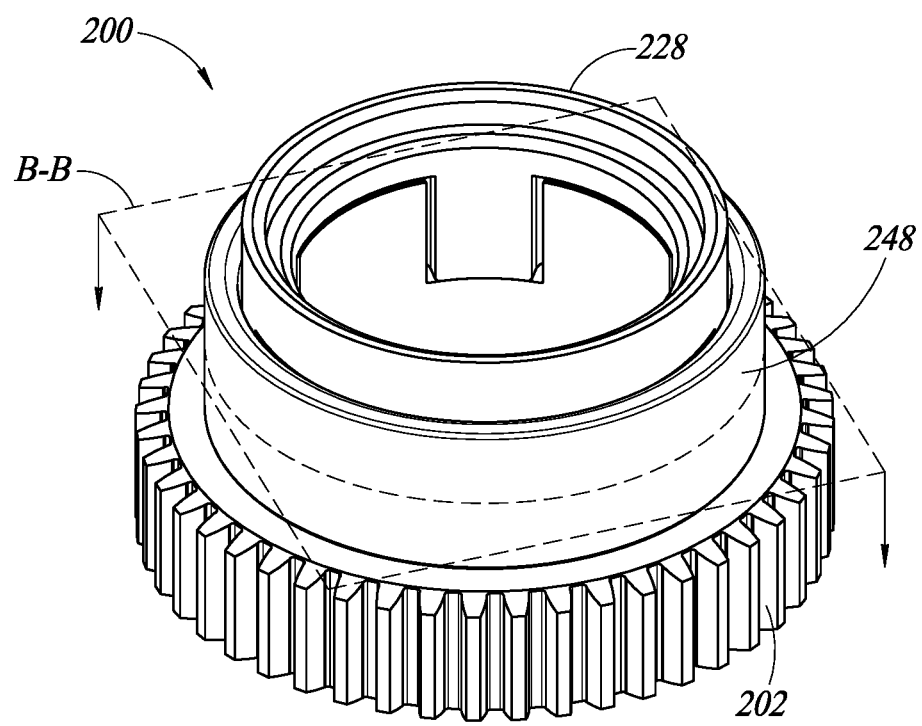
FIG. 6 is a top perspective view of an embodiment of an anti-back drive component for an output of a hand wheel according to the present disclosure.
Figure 7:
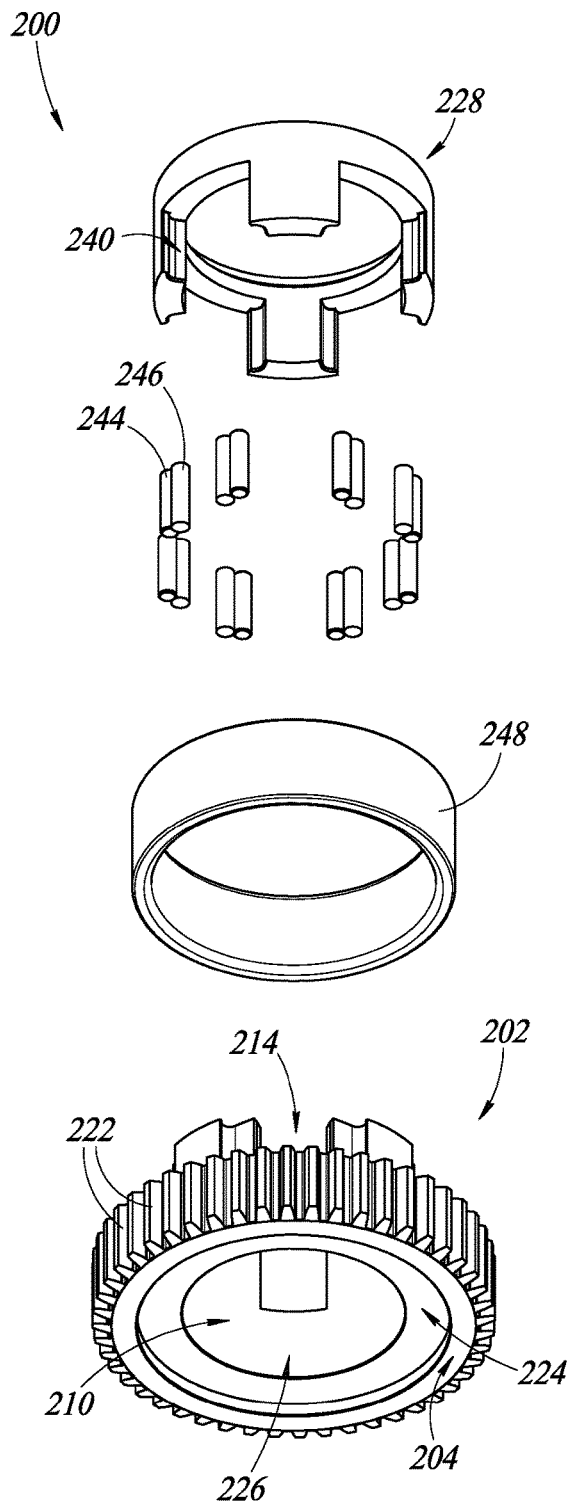
FIG. 7 is a bottom perspective exploded view of the anti-back drive component of FIG. 6.

At least to address these concerns, a valve actuator assembly of the present disclosure, such as valve actuator assembly 100, includes an anti-back drive component 200 coupled to the respective output of one or both of the hand wheel assembly 104 and the drive device 102 so as to selectively prevent rotation of the hand wheel assembly 104, the drive device 102, or both, as illustrated in FIG. 5. FIG. 5 is a cross-sectional view of the valve actuator assembly 100 along line A-A in FIG. 1 and illustrates the hand wheel assembly 104 including an output 146 with a first anti-back drive component 200 coupled to the output 146. The drive device 102 includes an output 148 with a second anti-back drive component 300 coupled to the output 148 of the drive 102. Each of the anti-back drive components 200, 300 are mechanically coupled to the output 116 of the valve actuator assembly 100 through a drive train 150. The drive train 150 includes a plurality of intermeshed or integrated gears 161 for transferring torque from the output 148 of the drive device 102 or the output 146 of the hand wheel assembly 104 to the output 116 of the valve actuator assembly 100 in order to open and close the valve 128 via the connector 138.

Rotation of the hand wheel assembly 104 rotates a drive shaft 152 mechanically coupled to the hand wheel assembly 104, which in turn, rotates the output 146 of the hand wheel assembly 104. Similarly, the drive device 102 includes a drive shaft 154, wherein rotation of the drive shaft 154 by the drive device 102 rotates the output 148 of the drive device 102. As will be explained in further detail below, rotation of the output 148 of the drive device 102, such as during operation of the drive device 102, allows for rotation of the second anti-back drive component 300, but the first anti-back drive component 200 prevents rotation of the output 146 and the drive shaft 152 of the hand wheel assembly. Similarly, if the hand wheel assembly 104 is operational and rotated about its axis, the first anti-back drive component 200 allows for rotation of the output 146 of the hand wheel assembly 104, but the second anti-back drive component 300 prevents rotation of the output 148 and the drive shaft 154 of the drive device 102. In this way, the anti-back drive components 200, 300 selectively prevent rotation of the hand wheel assembly 104 and the drive device 102 to which they are respectively mechanically coupled.

In an embodiment, the valve actuator assembly 100 includes only the first anti-back drive component 200, while in other embodiments, the valve actuator assembly 100 includes only the second anti-back drive component 300, while in further embodiments, the valve actuator assembly 100 includes both the anti-back drive components 200, 300. Moreover, the anti-back drive components 200, 300 may also be referred to as no-back devices, anti-drive devices, or locking devices or components.

Figure 8:
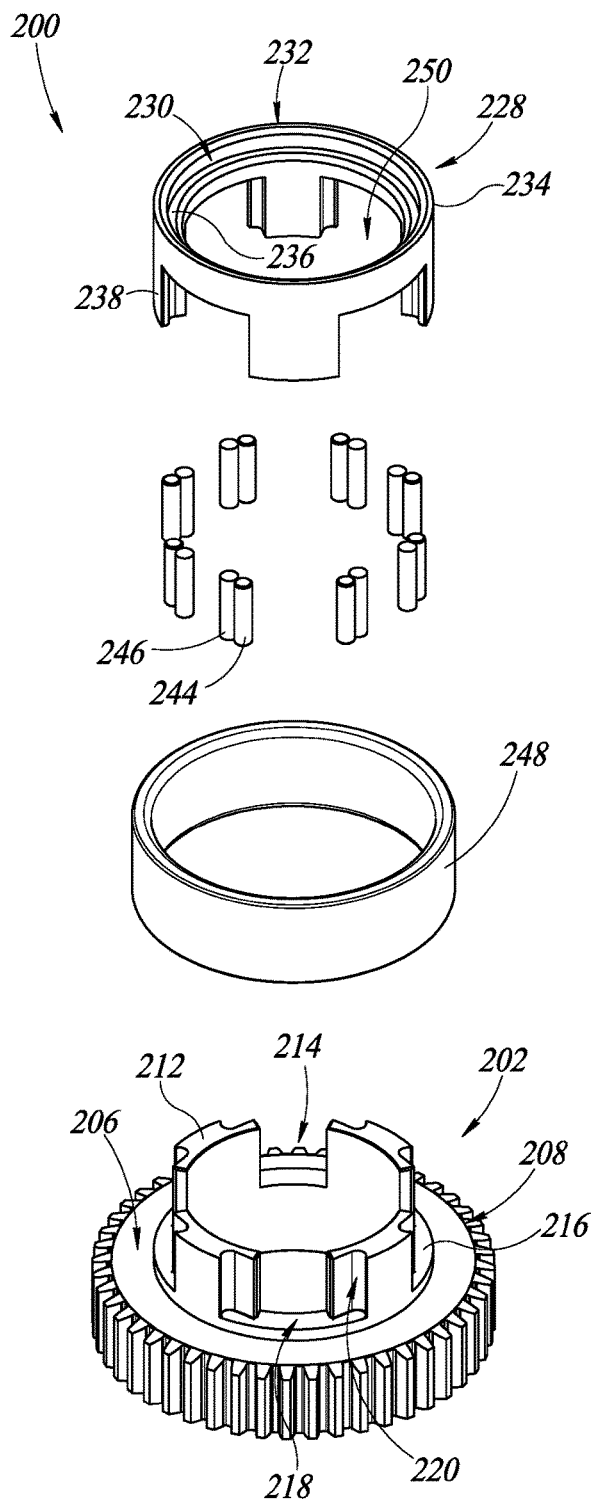
FIG. 8 is a top perspective exploded view of the anti-back drive component of FIG. 6.

FIGS. 6-9 are various views of one or more embodiments of the first anti-back drive component 200 to be integrated with the hand wheel assembly 104. The anti-back drive component 200 includes a first body 202 having a first surface 204 and a second surface 206 opposite the first surface 204. The first body 202 includes a third surface 208 and a fourth surface 210 opposite the third surface 208 with each of the third surface 208 and the fourth surface 210 extending between the first surface 204 and the second surface 206. The first body 202 includes a plurality of first protrusions 212 extending from the second surface 206 of the first body 202 with a space 214 between adjacent ones of the plurality of first protrusions 212. In one or more embodiments, the first body 202 further includes a ridge 216 extending from the second surface 206, where the ridge 216 is formed integrally with each of the plurality of first protrusions 212 as a single, unitary component. As shown in FIG. 8, each of the first protrusions 212 extends beyond an outer peripheral edge or surface 218 of the ridge 216. In other words, the ridge 216 is integral with the first protrusions 212 in one or more embodiments, with the ridge 216 extending from the second surface 206 and the protrusions 212 extending from the ridge 216. In one or more embodiments, the first protrusions 212 are spaced equidistant from each other in a circle about a central vertical axis through the first body 202. While the plurality of first protrusions 212 is illustrated as included four protrusions (see FIG. 8), the plurality of protrusions 212 can include more or less than four protrusions.

The first body 202 further includes at least one first recess 220 in each of the first protrusions 212. Preferably, each of the protrusions 212 includes an opposed pair of recesses 220. Further, the first body 202 includes a plurality of splines or teeth 222 extending from the third surface 208 of the first body 202 so as to facilitate a mechanical coupling of the splines 222 with an external structure or system, such as the drive train 150 of the valve actuator assembly 100 shown in FIG. 5. Moreover, in some embodiments, the first surface 204 of the first body 202 includes a recess 224 extending into the first surface 204 to define a ledge or step-down in the first surface 204. In the illustrated embodiment, the first body 202 is generally cylindrical in shape, with a first longitudinal bore 226 extending therethrough from the first surface 204 to the second surface 206. Each of the plurality of first protrusions 212 are preferably spaced equidistant about the longitudinal bore 226, such that the longitudinal bore 226 extends from the first surface 204 to a top or upper surface of each of the first protrusions 212.

FIGS. 6-9 further illustrate a second body 228 coupled to the first body 202. The second body 228 includes a first surface 232, which may be a top surface in one or more embodiments, and a recess 230 in the first surface 232 of the second body 228. The recess 230 creates a step-down configuration proximate the top of the second body 228. In other words, the second body 228 includes a first portion 234 including the first surface 232 and a second portion including the recess 230, wherein the first and second portions 234, 236 are in a step-down configuration. In an embodiment, a maximum dimension (e.g., thickness, width, diameter, etc.) of the second portion 236 is greater than a maximum dimension (e.g., thickness, width, diameter, etc.) of the first portion 234 of the second body 228. The second body 228 further includes a plurality of second protrusions 238 extending from the first portion 234. When assembled, as in FIG. 6, each of the plurality of second protrusions 238 are received in the space 214 between adjacent ones of the plurality of first protrusions 212 with a space or gap 252 between boundaries of the protrusions 212, 238. Moreover, each of the second protrusions 238 include at least one second recess 240. The second body 228 preferably has a generally cylindrical shape with a second longitudinal bore 250, with each of the plurality of second protrusions 238 spaced equidistant about the second longitudinal bore 250, in one or more embodiments. Each of the at least one first recesses 220 and each of the at least one second recesses 240 may include a straight, rectilinear portion and a second, curved portion, wherein the shape of each of the recesses 220, 240 facilitates movement of rotation members, as described below.

Figure 9:
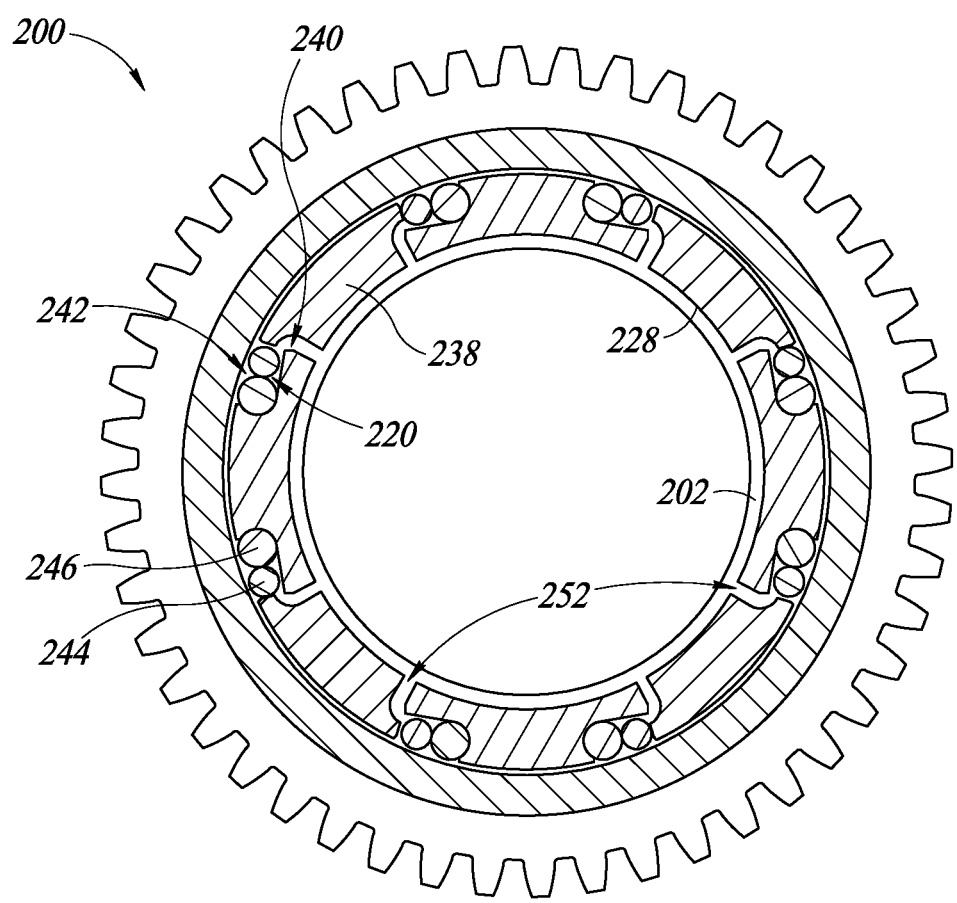
FIG. 9 is a cross-sectional view of the anti-back drive component of FIG. 6 at plane B-B.

As shown in FIG. 9, respective ones of the protrusions 212, 238 and the recesses 220, 240 cooperate to define a plurality of cavities 242 in the assembled anti-back drive component 200. A plurality of springs 244 are received in respective ones of the plurality of cavities 242, and more specifically, in the at least one recess 220 of each of the plurality of first protrusions 212. A plurality of rollers 246 are positioned proximate respective ones of the springs 244, such that each of the plurality of rollers 246 are in the respective one of the plurality of cavities 242. In other words, respective ones of the plurality of springs and rollers 244, 246 are paired together in each of the plurality of cavities 242. In other embodiments, each of the plurality of springs 244 and the plurality of rollers 246 may be referred to as rotation members, pins, rollers, or other like terms. The rollers are solid and do not compress with the application of pressure. The springs are elastomeric or otherwise resilient, such that they compress with pressure and return to their non-compressed state upon removal of the pressure.

FIG. 9 illustrates the springs and rollers 244, 246 being independent, separate components. In one embodiment, each of one of the rollers 246 comprise a metal (e.g., steel or hardened steel, among others), while each of the springs 244 comprise a foam that is preferably non-compressible and does not deform when subject to various forces. An example of such a foam is PORON® foam manufactured by Rogers. Each of the springs and rollers 244, 246 may generally be cylindrical, but may alternatively have a shape that is similar to an hourglass (e.g., thicker portions at the ends continuously tapering to a thinner portion in the middle). While it is preferable to use pairs of springs and rollers 244, 246 including separate components, one or more embodiments include a single, unitary cylindrical component received in respective ones of the cavities 242.

FIGS. 6-9 further illustrate a bearing ring 248 positioned about a periphery of each of the first and second bodies 202, 228. In other words, the bearing ring 248 overlies a portion of the first body 202 and the second body 228, as well as an entire length or height of each of the plurality of first and second protrusions 212, 238 so as to keep the rotation members 244, 246 in place in the cavities 242. The bearing ring 248, the first longitudinal bore 226, and the second longitudinal bore 250 are concentrically aligned with respect to one another to reduce friction between these moving parts. In operation, and with reference to FIG. 9, rotation of the second body 228 (which may also be referred to as an unlocking device or component, or generally as a device) clockwise about its axis pushes the springs 244, which in turn push the rollers 246 into position such that the rollers 246 can rotate about their respective axis. Rotation of the rollers 246 about their axis enables rotation of the entire first anti-back drive component 200 in a clockwise direction in the orientation shown in FIG. 9. For example, rotating the second body 228 about its axis pushes the springs 244 and the rollers 246 laterally and toward the axis of rotation, such that the springs and rollers 244, 246 do not impede the rotation of the entire anti-back drive component in the clockwise direction.

Conversely, rotation of the first body 202, which may also be referred to as a locking device or component or generally as a device, about its axis in a counterclockwise direction will force the springs and rollers 244, 246 into a position in the cavities 242 such that the springs 244 create friction with the rollers 246, which prevents rotation of the rollers 246. For example, rotating the second body 228 about its axis pushes the springs and rollers 244, 246 laterally and away from the axis of rotation, which causes friction between the springs 244 and the rollers 246, thus preventing rotation of the rollers 246 and consequently, of the entire first anti-back drive component 200. Because the second body 228 is mechanically coupled to the output 146 of the hand wheel assembly 104 (FIG. 5), it follows that rotation of the hand wheel assembly 104 clockwise will enable rotation of the first anti-back drive component 200, as described above. Conversely, rotation of the output 148 of the drive device 102, to which the first anti-back drive component 200 is mechanically coupled by the drive train 150 (FIG. 5), will attempt to rotate the first body 202 counterclockwise, which will prevent rotation of the first anti-back drive component 200, and thus prevent rotation of the hand wheel assembly 104, as described above. In one embodiment, the order of each pair of springs and rollers 244, 246 are reversed to enable rotation counterclockwise, but prevent rotation clockwise, as shown and described with reference to FIG. 13.

Figure 13:
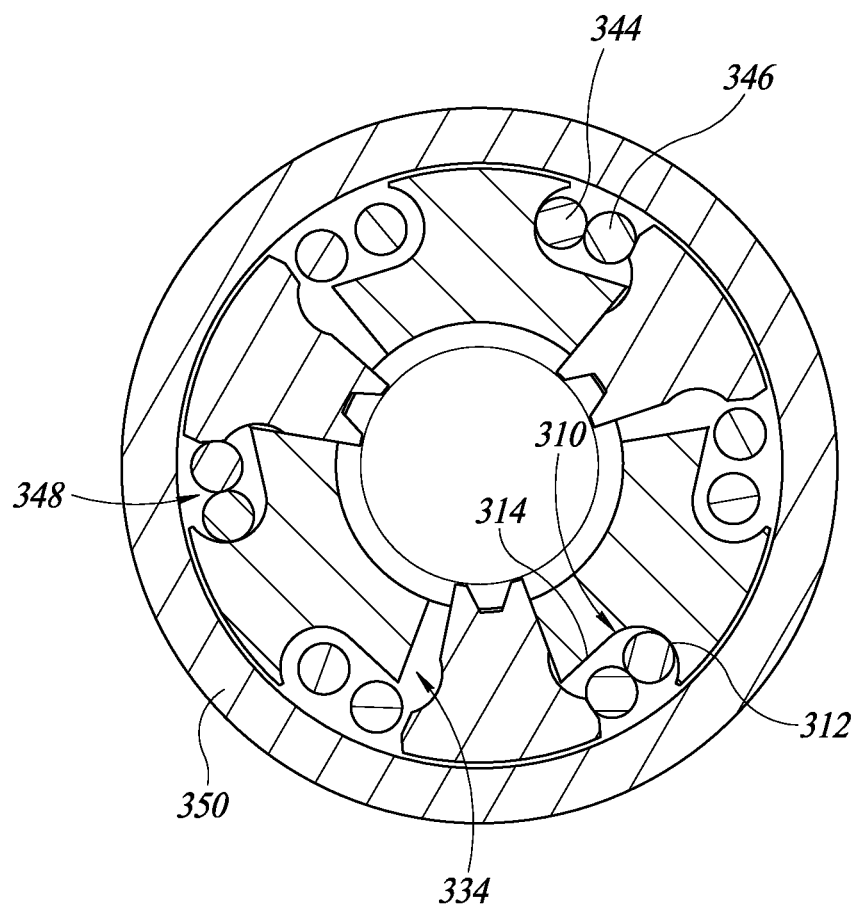
FIG. 13 is a cross-sectional view of the anti-back drive component of FIG. 10 at plane C-C.

FIGS. 10-13 illustrate various views of one or more embodiments of the second anti-back drive component 300 shown in FIG. 5. With reference to FIGS. 10-13, the second anti-back drive component 300 includes a locking device 302 having a base 304 and a first surface 306 opposite the base 304. The locking device 302 further includes including a plurality of first protrusions or flanges 308 extending from the first surface 306, wherein each of the plurality of first protrusions 308 are in spaced relationship relative to one another. The plurality of first protrusions 308 include a plurality of first channels 310 extending into each of the plurality of first protrusions 308. Preferably, each protrusion of the plurality of first protrusions 308 includes an opposed pair of channels of the plurality of first channels 310 and each channel of the plurality of first channels 310 includes a curved portion 312 and a rectilinear portion 314, as best shown in FIG. 13.

A first longitudinal bore, through hole, or aperture 316 extends through the locking device 302 from the base 304 to the first surface 306. In an embodiment, the plurality of first protrusions 308 extend from the first surface 306 in equidistant spaced relationship about the first longitudinal bore 316, such that the bore 316 extends from the base 304 to an upper or top surface of each of the plurality of first protrusions 308. In other embodiments, the plurality of first protrusions 308 are in spaced relationship, but not in equidistant spaced relationship. Instead, the plurality of first protrusions 308 may have any number of different spatial relationships or orientations relative to each other. Additionally or alternatively, the plurality of first protrusions 308 may be formed as a single, integral, unitary piece, with cavities or recesses formed therein (i.e. through milling, etc.) between respective protrusions 308. A plurality of first teeth 320 extend from a second surface 318 of the locking device 302, wherein the second surface 318 extends between the base 304 and the first surface 306. The plurality of first teeth 320 are preferably positioned proximate a peripheral edge 322, which may be an outermost peripheral edge, of the base 304. In an embodiment, an inner peripheral edge 324 of the base 304 where the base 304 adjoins boundaries of the first longitudinal bore 316 may be chamfered or rounded.

Figure 10:
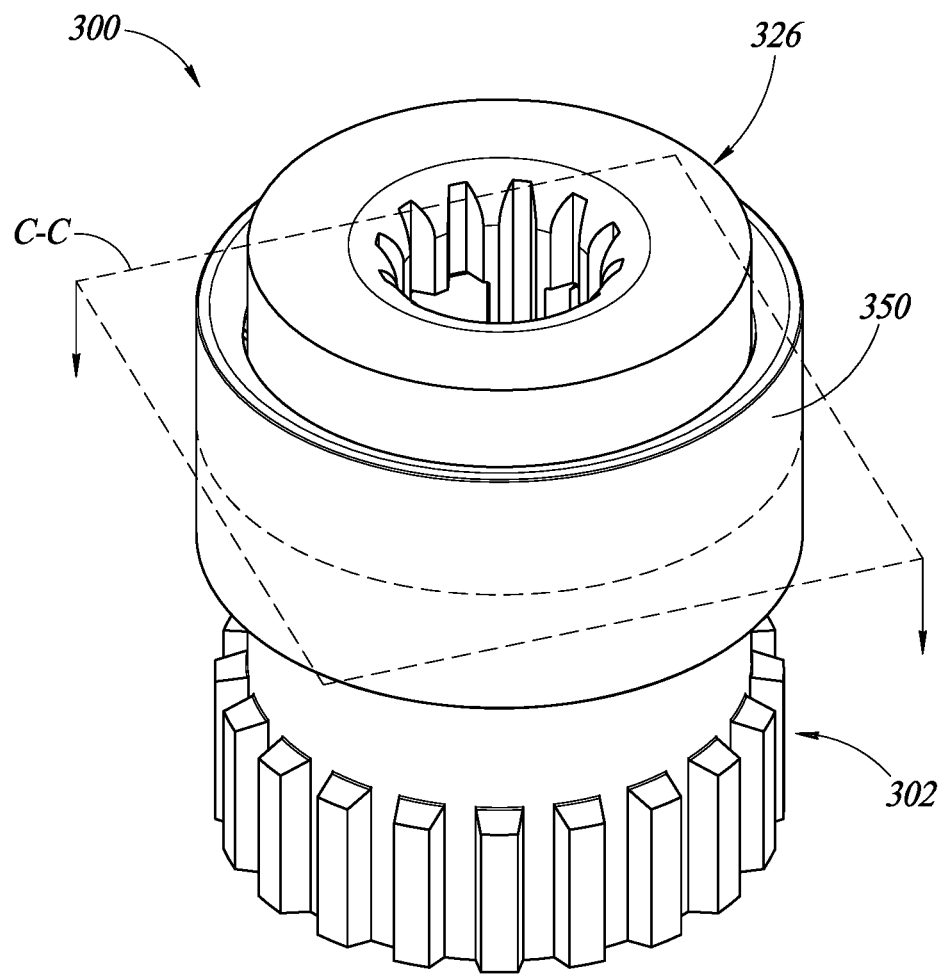
FIG. 10 is a top perspective view of an embodiment of an anti-back drive component for an output of a drive device according to the present disclosure.
Figure 11:
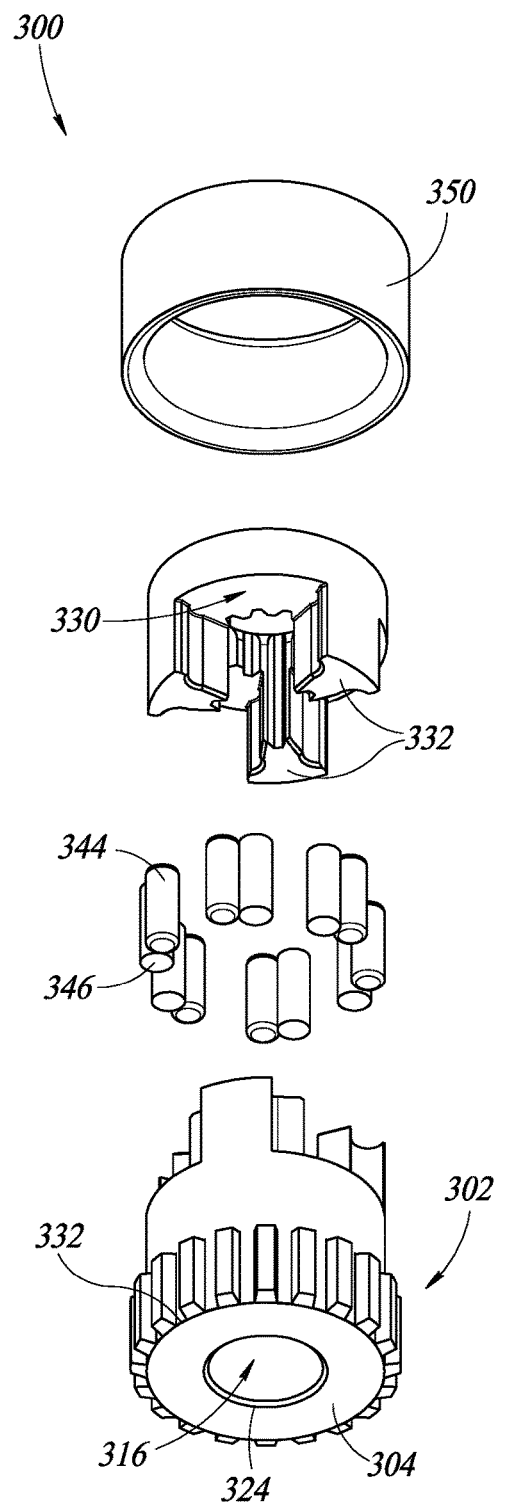
FIG. 11 is a bottom perspective exploded view of the anti-back drive component of FIG. 10.
Figure 12:
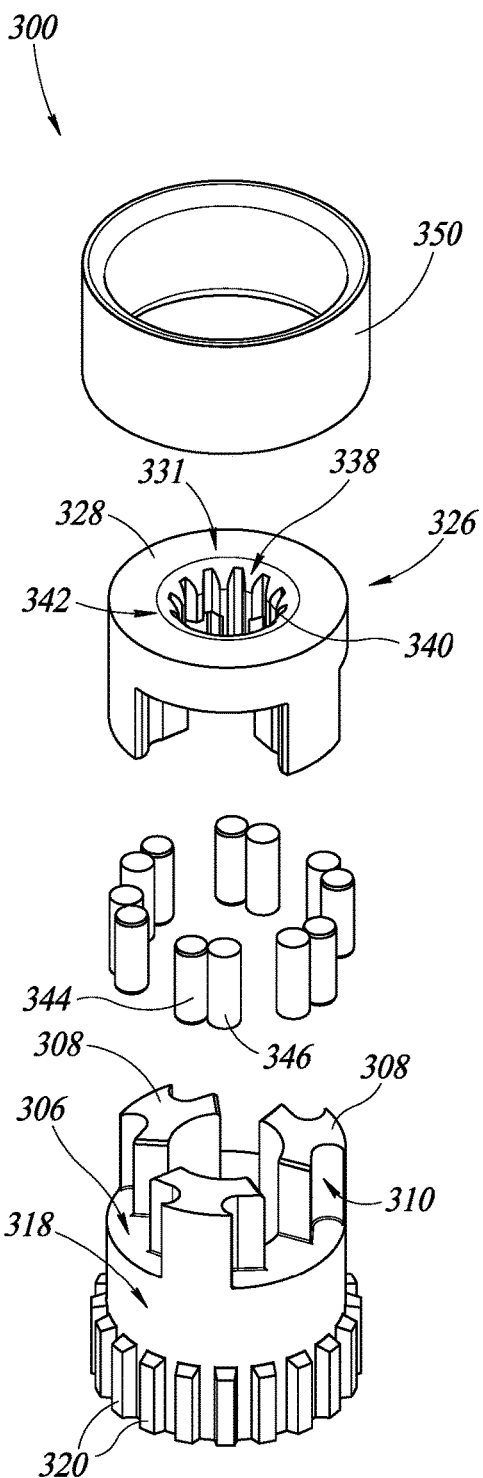
FIG. 12 is a top perspective exploded view of the anti-back drive component of FIG. 10.

FIGS. 10-13 further illustrate an unlocking device 326 that, as shown in FIG. 10, is mechanically and physically coupled to the locking device 302. The unlocking device 326 similarly includes a base 328 with a first surface 330 and a second surface 331 opposite the first surface 330, wherein a plurality of second protrusions 332 extend from the first surface 330. In the anti-back drive component 300, each of the plurality of second protrusions 332 are received in the space between respective ones of the plurality of first protrusions 308 with a gap 334 between a respective peripheral edge of each of the plurality of first protrusions 308 and each of the plurality of second protrusions 332. Further, a plurality of second channels 336 extend into each of the plurality of second protrusions 332. Preferably, each of the plurality of second protrusions 332 include an opposed pair of the plurality of second channels 336.

The unlocking device 326 includes a second longitudinal bore, through hole, or aperture 338 extending therethrough from the base 328 to the first surface 330. Further, the unlocking device 326 includes a plurality of second teeth 340 extending from a second surface 342 of the unlocking device 326. As illustrated, the second plurality of teeth 340 extend into the second longitudinal bore 338 along a height of the unlocking device 326, wherein each protrusion of the plurality of second protrusions 332 preferably includes two teeth of the plurality of second teeth 340. Further, each of the second protrusions 332 preferably extend from the first surface 330 in equidistant spaced relationship about the second longitudinal bore 338.

The second anti-back drive component 300 further includes a plurality of rollers 344, wherein each roller of the plurality of rollers 344 is received in a respective one of the plurality of first channels 310. The component 300 includes a plurality of springs 346 received in respective ones of the plurality of first channels 310 proximate respective ones of the plurality of rollers 344. In one embodiment, each of the plurality of rollers 344 are metal, such as stainless steel, and each of the plurality of springs 346 are foam, such as PORON® foam. As shown in FIG. 13, each of the plurality of first channels 310 and respective ones of the plurality of second channels 336 cooperate to define a plurality of cavities or recesses or spaces 348, wherein a roller and spring pair including a first one of each of the plurality of rollers 344 and a corresponding separate first one of the plurality of springs 346 is received in each of the cavities 348. Further, the second anti-back drive component 300 includes a bearing ring 350 surrounding a portion of the unlocking device 326 and the locking device 302 proximate a location of the plurality of rollers 344 and the plurality of springs 346. Preferably, the bearing ring 350 and the longitudinal bores 316, 338 of the locking device 302 and the unlocking device 326, respectively, are aligned concentrically so as to reduce friction between components.

During operation, the second anti-back drive component 300 functions similarly to the first anti-back drive component 200 described above. However, the second component 300 is arranged to enable rotation counterclockwise, as opposed to clockwise, as with the first component 200. With respect to the second component 300, the plurality of second teeth 338 of the unlocking device 326 are intermeshed with corresponding structures on the drive shaft 154 of the drive device 102 (FIG. 5). Rotation of the unlocking device 326 counterclockwise relative to the orientation shown in FIG. 13 via the drive shaft 154 (FIG. 5) pushes the pairs of rollers and springs 344, 346 into a position with respect to the channels 310, 336 such that the rollers 344 can rotate about their respective axis. Rotation of the rollers 344 enables rotation of the entire anti-back drive component 300, including the plurality of first teeth 320, which are intermeshed with the drive unit 150 of the valve actuator assembly 100 (FIG. 5). As described above, such rotation prevents rotation of the hand wheel assembly 104 via the first anti-back drive component 200. When the hand wheel assembly 104 is rotated, and the torque is transferred to the plurality of first teeth 320 of the locking device 302, rotation of the locking device 302 clockwise forces the pairs of rollers and springs 344, 346 into a position such that the rollers 344 are prevented from rotation about their respective axis due to friction from the springs 346 (e.g., the springs 346 create friction to prevent the rollers 344 from rotating about their axis), which prevents rotation of the anti-back drive component 300, and thus, prevents rotation of the drive shaft 154 of the drive device 102 (FIG. 5). In this way, the anti-back drive components 200, 300 described herein selectively prevent rotation of the hand wheel assembly 104 and the drive device 102. In one embodiment, the order or orientation of the rollers 344 relative to the springs 346 is reversed for each pair of rollers and springs 344, 346, so as to enable rotation of the second component 300 clockwise, as shown and described with reference to FIG. 13. In other embodiments, the rollers 344 and springs 346 may be referred to as rotation members, pins, rollers, or other like terms.

Figure 14:
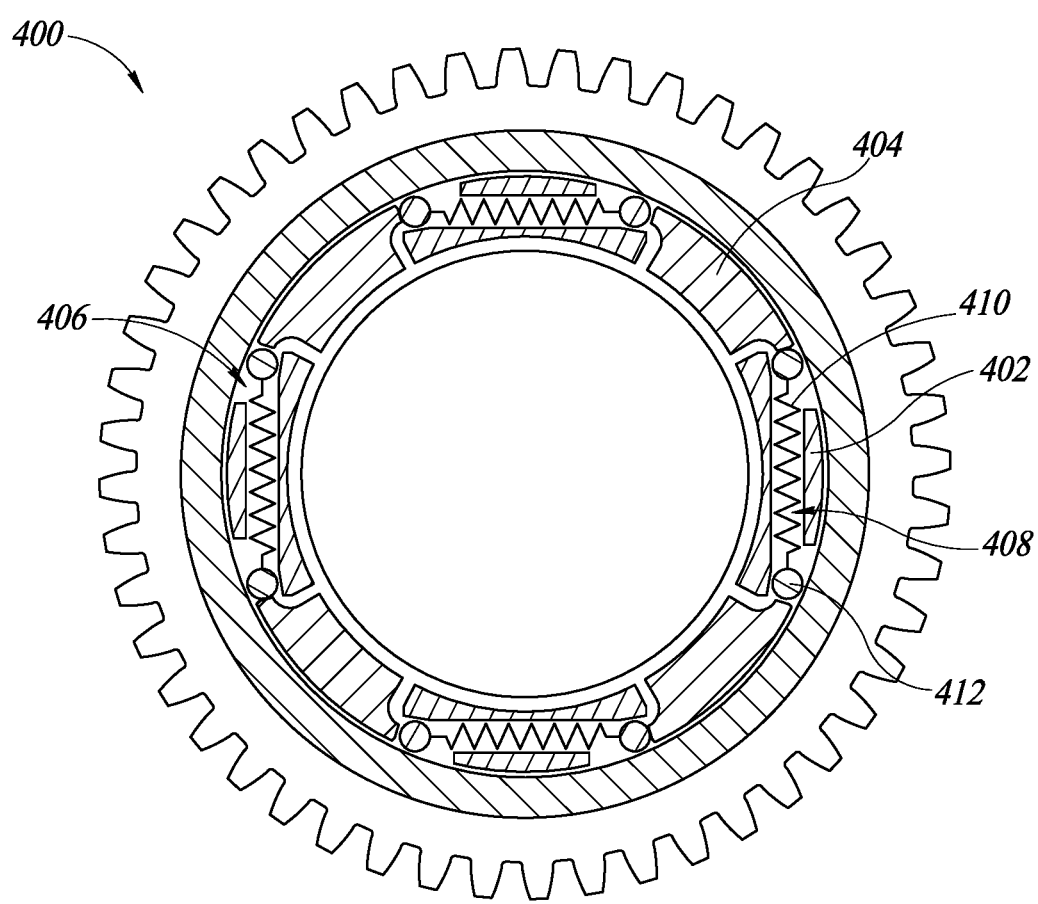
FIG. 14 is a cross-sectional view of an embodiment of an anti-back drive component for an output of a drive device according to the present disclosure.

FIG. 14 is a cross-sectional view of an embodiment of anti-back drive component 400. The anti-back drive component 400 is similar to the anti-back drive component 200 described herein. For example, the anti-back drive component 400 includes first protrusions 402 and second protrusions 404 that cooperate to define a plurality of cavities 406. However, the anti-back drive component 400 includes holes 408 extending laterally through the first protrusions 402. A spring 410 is arranged in the each of the holes 408 and extends through the respective first protrusions 402. Rollers 412 are received in the cavities 406. Specifically, one roller 412 is received in each of the cavities 406, as shown in FIG. 14. Each of the springs 410 is associated with two rollers 412.

In alternate embodiments, there may be one spring 410 per roller 412. For example, the holes 408 may not extend through first protrusions 402. Rather, pairs of cavities may be present in the first protrusions 412 with a portion of the protrusions 412 between and dividing the cavities. Each spring would be received in one cavity and associated with one roller 412. Alternatively, holes 408 may be omitted and springs 410 coupled to sides of the protrusions 412, in which case, one spring 410 would be associated with one roller 412. In operation, the springs 410 act with a force to bias the rollers 412 into position in the cavities 406 to permit or restrict rotational motion, similar to springs 244 described above. The springs 410 may be any material that provides suitable biasing force on rollers 412. In some embodiments, the springs 410 are a metal that has an elasticity that allows springs 410 to provide a greater biasing force on rollers 412 than some embodiments of the springs 244. Moreover, springs 410 that are metal may have a longer operational life than the springs 244 because of the durability of metal as compared to foam. In other words, the springs 410 may withstand a larger number of cycles in their useful life before requiring replacement, compared to some embodiments of springs 244. As such, in embodiments, the anti-back drive component 400 is used with drive devices with higher forces or revolutions per minute compared to some embodiments of the anti-back drive component 200.

Figure 15:
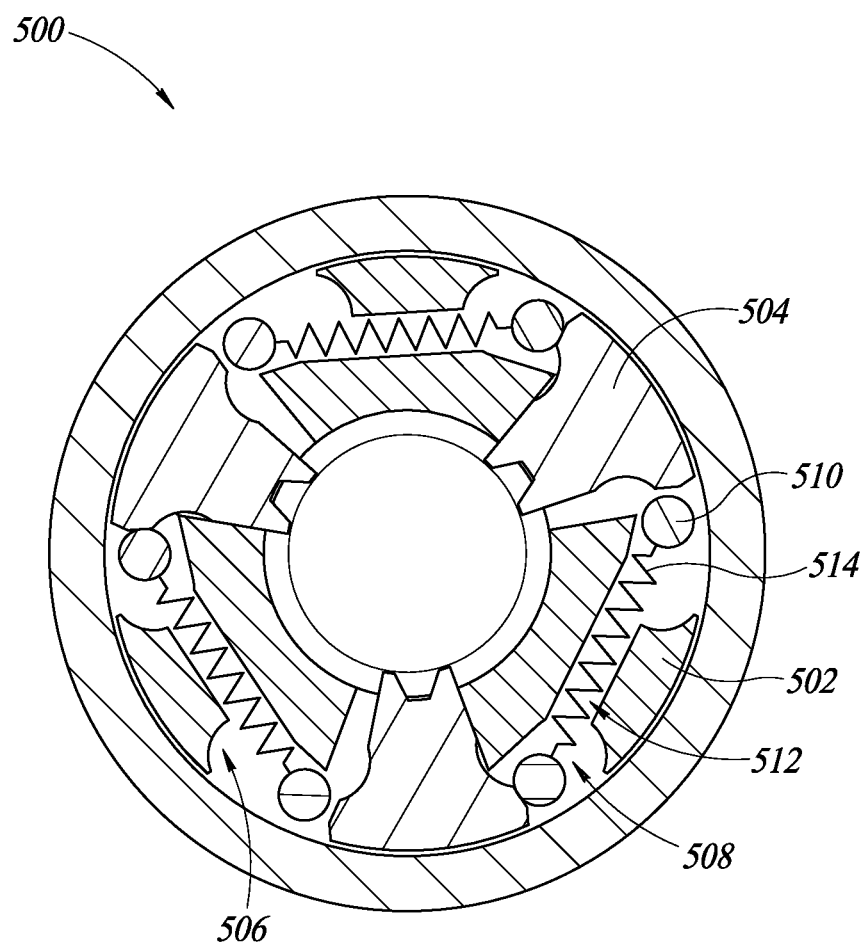
FIG. 15 is a cross-sectional view of an embodiment of an anti-back drive component for an output of a drive device according to the present disclosure.

FIG. 15 illustrates an embodiment of an anti-back drive component 500, which may be similar to anti-back drive component 300. Anti-back drive component 500 includes first protrusions 502 and second protrusions 504 with the first protrusions 502 received in spaces between protrusions 504. Each of the protrusions 502, 504 includes recesses 506 and cooperate to define cavities 508. A plurality of rollers 510 are received in the cavities 508. As shown in FIG. 15, one roller 510 is in each cavity 508, although other embodiments include more than one roller 510 per cavity 508. A plurality of holes 512 extend through the first protrusions 502, with one hole 512 per protrusion 502, in some embodiments. Springs 514 are received in and extend through the respective holes 512. Each spring 514 is associated with two rollers 510 and acts to bias the rollers 510 to permit or prevent rotation, as described above with reference to rollers 344. As described above with regard to springs 410, springs 514 may be any material that provides suitable biasing force on rollers 510. In some embodiments, springs 514 are metal.

In some embodiments, an actuator includes a first anti-back drive component (e.g., anti-back drive component 200 or 300), and a second anti-back drive component (e.g., anti-back drive component 400 or 500). For example, anti-back drive component 200 may be coupled to an output of a hand wheel of an actuator while anti-back drive component 500 is coupled to an output of a motor of the actuator. In other embodiments, anti-back drive component 300 is coupled to the output of the motor and anti-back drive component 400 is coupled to the output of the hand wheel. As such, the particular anti-back drive component and their arrangement can be selected based on design specifications and expected useful life of the actuator. Where an actuator includes multiple anti-back drive components, the anti-back drive components are connected together (e.g., through a drive train or gear assembly) as described herein, such that the anti-back drive components permit rotation of the output of a first drive device while preventing the output from causing rotation of an input of a second drive device. As such, the present disclosure provides a device comprising: a locking device having a base and a first surface opposite the base, the locking device including a plurality of first protrusions extending from the first surface of the locking device, the plurality of first protrusions including a plurality of first channels extending into each of the plurality of first protrusions; an unlocking device coupled to the locking device and having a base opposite a first surface of the unlocking device, the unlocking device including a plurality of second protrusions extending from the first surface of the unlocking device, each of the plurality of second protrusions in a space between respective ones of the plurality of first protrusions with a gap between a respective peripheral edge of each of the plurality of first protrusions and each of the plurality of second protrusions, wherein a plurality of second channels extend into each of the plurality of second protrusions; a plurality of rollers, each roller of the plurality of rollers in a respective one of the plurality of first channels; and a plurality of springs, each spring of the plurality of springs aligned with respective ones of the plurality of rollers.

The present disclosure further provides a device comprising: a bearing ring surrounding a portion of the unlocking device and the locking device proximate to a location of the plurality of rollers and the plurality of springs; a first longitudinal bore extending through the locking device from the base to the first surface; the plurality of first protrusions extending from the first surface in equidistant spaced relationship about the first longitudinal bore; a plurality of first teeth extending outward from a second surface of the locking device; the plurality of first teeth extending from a second surface of the locking device proximate a peripheral edge of the base; each protrusion of the plurality of first protrusions including an opposed pair of channels of the plurality of first channels and each channel of the plurality of first channels including a curved portion and a rectilinear portion; a second longitudinal bore extending through the unlocking device from the base to the first surface, and a plurality of second teeth extending from a second surface of the unlocking device, the second plurality of teeth extending into the second longitudinal bore; each of the plurality of second protrusions extending from the first surface of the unlocking device in equidistant spaced relationship about the second longitudinal bore; each protrusion of the plurality of second protrusions including an opposed pair of channels of the plurality of second channels; each of the plurality of springs being in the space between each of the plurality of first channels and each of the plurality of second channels; and wherein during operation, rotation of the unlocking device relative to the locking device enables rotation of each of the plurality of rollers about their respective axis, and wherein rotation of the locking device prevents rotation of each of the rollers about their respective axis.

The present disclosure provides a device comprising: a first body having a first surface opposite a second surface and a third surface opposite a fourth surface, each of the third and fourth surfaces extending between the first and second surfaces, the first body including a plurality of first protrusions extending from the second surface of the first body with a space between adjacent ones of the plurality of first protrusions, the first body further including at least one first recess in each of the plurality of second protrusions; a second body coupled to the first body and having a first portion integral with a second portion, the second body further including a plurality of second protrusions extending from the first portion, each of the plurality of second protrusions received in the space between adjacent ones of the plurality of first protrusions and including at least one second recess; a plurality of cavities between the at least one first recess of each of the plurality of first protrusions and a respective at least one second recess of each of the plurality of second protrusions; a plurality of springs, each of the plurality of springs in a respective one of the plurality of cavities; and a plurality of rollers, each of the plurality of rollers in the respective one of the plurality of cavities proximate to corresponding ones of the plurality of springs.

The present disclosure further provides a device comprising: a plurality of splines extending from the third surface of the first body, and a recess extending into the first surface; a ridge extending from the second surface integral with each of the plurality of first protrusions, each of the plurality of first protrusions extending beyond an outer peripheral edge of the ridge; and a maximum dimension of the first portion being greater than a maximum dimension of the second portion of the second body.

The present disclosure provides a system comprising: a valve; a valve actuator assembly coupled to the valve, the valve actuator assembly including: a motor having a motor output; a hand wheel having a hand wheel output; and a first anti-back drive component that includes: a locking component having a body and a plurality of first flanges extending from the body of the locking component, each flange of the plurality of flanges includes an opposed pair of first channels; an unlocking component coupled to the locking component and having a body with a plurality of second flanges extending from the body of the unlocking component, each flange of the plurality of second flanges includes an opposed pair of second channels, each flange of the plurality of second flanges in a space between respective ones of the plurality of first flanges; a plurality of recesses between the opposed pairs of first channels and the opposed pairs of second channels cooperating; and a plurality of first pairs of springs and rollers, each pair of the plurality of first pairs of springs and rollers in respective ones of the plurality of cavities.

The present disclosure further provides a system comprising: each pair of springs and rollers of the plurality of first pairs of springs and rollers including the rollers including metal and the springs including foam; a second anti-back drive component coupled to the hand wheel output, the first anti-back drive component being coupled to the motor output, the second anti-back drive component including: a first body having a plurality of first protrusions extending from a first surface of the first body with a space between adjacent ones of the plurality of second protrusions, the first body further including at least one first recess in each of the plurality of second protrusions; a second body coupled to the first body and having a plurality of second protrusions extending from a second surface of the second body, each of the plurality of second protrusions in the space between adjacent ones of the plurality of first protrusions and including at least one second recess; a plurality of cavities, each of the plurality of cavities including at least one first recess of the plurality of first protrusions and a respective at least one second recess of the plurality of second protrusions; and a plurality of second pairs of springs and rollers in each of the plurality of cavities; and wherein during operation, rotation of the first anti-back drive component about its axis prevents rotation of the second anti-back drive component about its axis, the first anti-back drive component mechanically coupled to the second anti-back drive component through splines on respective outer surfaces of the first anti-back drive component and the second anti-back drive component, the splices mechanically coupled to a drive assembly of the valve assembly.

The present disclosure provides a device comprising: a first anti-back drive device including: a locking device including a first base, a plurality of first protrusions extending from the first base in spaced relationship, and a plurality of first channels extending into the plurality of first protrusions; an unlocking device coupled to the locking device including a second base, a plurality of second protrusions extending from the second base in spaced relationship, each of the plurality of second protrusions being arranged in a space between respective ones of the plurality of first protrusions, and a plurality of second channels extending into the plurality of second protrusions; a plurality of rollers, each roller of the plurality of rollers in a respective one of the plurality of first channels; and a plurality of springs, each spring of the plurality of springs aligned with respective ones of the plurality of rollers.

The present disclosure further provides a device comprising: a bearing ring surrounding a portion of the unlocking device and the locking device proximate to a location of the plurality of rollers; the first base including a first peripheral edge, the device further comprising a plurality of first teeth extending from the first peripheral edge of the locking device; each protrusion of the plurality of first protrusions including an opposed pair of channels of the plurality of first channels and each channel of the plurality of first channels includes a curved portion and a rectilinear portion; a longitudinal bore extending through the second base of the unlocking device, and a plurality of second teeth extending from the second base into the longitudinal bore; and each protrusion of the plurality of second protrusions including an opposed pair of channels of the plurality of second channels.

The present disclosure further provides a device comprising: a second anti-back drive device configured to be mechanically coupled to the first anti-back drive device, including: a plurality of third protrusions, a plurality of fourth protrusions, a plurality of holes, each of the plurality of holes extending through a respective one of the plurality of third protrusions, a plurality of springs, each of the plurality of springs extending through a respective one of the plurality of holes, and a plurality of rollers received in a plurality of cavities between respective ones of the plurality of third protrusions and the plurality of fourth protrusions, each spring of the plurality of springs being adjacent to at least one roller of the plurality of rollers.

The present disclosure provides a system comprising: a first device coupled to an output of a hand wheel of an actuator, including a first body, a plurality of first protrusions extending from the first body with a space between adjacent ones of the plurality of first protrusions, a second body, a plurality of second protrusions extending from the second body, each of the plurality of second protrusions received in the space between adjacent ones of the plurality of first protrusions, a plurality of first cavities between ones of the plurality of first protrusions and respective ones the plurality of second protrusions, a plurality of first springs, and a plurality of first rollers, each of the plurality of first rollers in a respective one of the plurality of first cavities proximate to one of the plurality of first springs; and a second device coupled to an output of a motor of the actuator and mechanically coupled to the first device.

The present disclosure further provides a system comprising: the second device further including a plurality of third protrusions, a plurality of fourth protrusions, a plurality of second cavities between ones of the plurality of third protrusions and respective ones of the plurality of fourth protrusions, and a plurality of holes, each of the plurality of holes extending through a respective one of the plurality of third protrusions; the second device further including a plurality of second springs, each of the plurality of second springs extending through a respective one of the plurality of holes, and a plurality of second rollers received in the plurality of second cavities, each spring of the plurality of second springs associated with at least one roller of the plurality of second rollers; and the first device further including a ridge extending from the first body and having an outer peripheral edge, each of the plurality of first protrusions extending beyond the outer peripheral edge of the ridge.

The present disclosure further provides a system comprising: the plurality of first springs being arranged substantially parallel to the plurality of first rollers and wherein the plurality of second springs are transverse to the plurality of second rollers; the second device further including a plurality of second springs, and a plurality of second rollers that is transverse to the plurality of second springs; each of the plurality of first springs being in the respective one of the plurality of first cavities and aligned with the plurality of first rollers; a plurality of holes through the plurality of first protrusions of the first device, the plurality of first springs of the first device received in a respective one of the plurality of holes; and the second device including a plurality of second cavities, a plurality of second springs, at least one spring of the plurality of second springs in respective ones of the plurality of second cavities, and a plurality of second rollers, at least one roller of the plurality of second rollers in respective ones of the plurality of second cavities proximate a corresponding one of the plurality of second springs.

The present disclosure provides a system comprising: a first anti-back drive component coupled to an output of a first drive device, including a locking component having a first body and a plurality of first flanges extending from the first body, each flange of the plurality of first flanges including an opposed pair of first channels, an unlocking component coupled to the locking component and having a second body with a plurality of second flanges extending from the second body, each flange of the plurality of second flanges including an opposed pair of second channels, each flange of the plurality of second flanges in a space between respective ones of the plurality of first flanges, a plurality of first recesses between the opposed pairs of first channels and the opposed pairs of second channels, a plurality of first springs, and a plurality of first rollers, at least one roller of the plurality of first rollers in each of the plurality of first recesses; and a second anti-back drive component coupled to an output of a second drive device and mechanically coupled to the first anti-back drive component.

The present disclosure further provides a system comprising: a spring of the plurality of first springs being in each of the plurality of first recesses with a corresponding roller of the plurality of first rollers; the second anti-back drive component including a third body having a plurality of third protrusions extending from the third body with a space between adjacent ones of the plurality of third protrusions, the first body further including at least one second recess in each of the plurality of third protrusions, a fourth body coupled to the third body and having a plurality of fourth protrusions extending from the fourth body, each of the plurality of fourth protrusions in the space between adjacent ones of the plurality of third protrusions and including at least one third recess, a plurality of cavities, each of the plurality of cavities including at least one second recess of the plurality of third protrusions and a respective at least one third recess of the plurality of fourth protrusions, a plurality of holes through the plurality of third protrusions, a plurality of second springs, each of the plurality of second springs in a respective one of the plurality of holes, and a plurality of second rollers in the plurality of cavities; and each of the plurality of second springs is coupled to two of the plurality of the second rollers, the plurality of second springs being transverse to the plurality of second rollers.

In the foregoing description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with valve actuator assemblies and methods and with anti-back drive components, devices, systems, and methods have not been shown or described in detail to avoid unnecessarily obscuring descriptions of the embodiments.

As used herein, the term "valve" is broadly construed to include a device capable of regulating a flow of one or more substances by opening, closing, or partially blocking one or more passageways. For example, a valve can halt or control the flow of a fluid (e.g., a liquid, a gas, or mixtures thereof) through a conduit, such as a pipe, tube, line, duct, or other structural component (e.g., a fitting) for conveying substances. Valve types include ball valves, butterfly valves, globe valves, plug valves, and the like.

Further, as used herein, the term "gear" is broadly construed to include a device for transferring force (e.g., torque, etc.) from one object to another, and includes devices with structures such as ribs, channels, teeth, splines, protrusions, extensions, projections, or other structural components to accomplish such transfer by meshing with another device having corresponding structures.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense that is as meaning "and/or" unless the content clearly dictates otherwise.

The relative terms "approximately" and "substantially," when used to describe a value, amount, quantity, or dimension, generally refer to a value, amount, quantity, or dimension that is within plus or minus 5% of the stated value, amount, quantity, or dimension, unless the content clearly dictates otherwise. It is to be further understood that any specific dimensions of components provided herein are for illustrative purposes only with reference to the embodiments described herein, and as such, the present disclosure includes amounts that are more or less than the dimensions stated, unless the context clearly dictates otherwise.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied outside of the valve actuator assembly context, and not necessarily the exemplary valve actuator assembly systems, methods, and devices generally described above.

For example, the actuator assemblies and anti-back drive components described herein have broader applicability beyond valves. While the illustrated embodiments include an actuator assembly for a valve, it is to be appreciated that modifications within the scope of this disclosure include the actuator assembly and anti-back drive components described herein adapted for used for any other device, method or system which utilizes force or torque to make a component move. As one example, among others, the actuators and anti-back drive components described herein can be used to control the position of a mechanical device that regulates the speed of a rotating system. In particular, one of the actuator assemblies, such as valve actuator assembly 100 described herein, can be used on an adjustable speed drive, such as a FluxDrive® adjustable speed drive, wherein the actuator is used in a linear mode to push and pull a yoke controlling the separation of the inner and outer drums of the adjustable speed drive. However, other applications and adaptations are contemplated and expressly included herein.

For instance, the foregoing detailed description has set forth various embodiments of the devices and processes via the use of certain embodiments. Insofar as such embodiments contain one or more functions and operations, it will be understood by those skilled in the art that each function and operation within such embodiment can be implemented, individually or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory media.

Many of the methods described herein can be performed with variations. For example, many of the methods may include additional acts, omit some acts, and perform acts in a different order than as illustrated or described.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a first anti-back drive device including:
a locking device including:
a first base;
a plurality of first protrusions extending from the first base in spaced relationship; and
a plurality of first channels extending into the plurality of first protrusions;
an unlocking device coupled to the locking device including:
a second base;
a plurality of second protrusions extending from the second base in spaced relationship, each of the plurality of second protrusions being arranged in a space between respective ones of the plurality of first protrusions; and
a plurality of second channels extending into the plurality of second protrusions;
a plurality of rollers, each roller of the plurality of rollers in a respective one of the plurality of first channels; and
a plurality of springs, each spring of the plurality of springs aligned with respective ones of the plurality of rollers.

2. The device of claim 1 further comprising:
a bearing ring surrounding a portion of the unlocking device and the locking device proximate to a location of the plurality of rollers.

3. The device of claim 1 wherein the first base includes a first peripheral edge, the device further comprising:
a plurality of first teeth extending from the first peripheral edge of the locking device.

4. The device of claim 1 wherein each protrusion of the plurality of first protrusions includes an opposed pair of channels of the plurality of first channels and each channel of the plurality of first channels includes a curved portion and a rectilinear portion.

5. The device of claim 1 further comprising:
a longitudinal bore extending through the second base of the unlocking device; and
a plurality of second teeth extending from the second base into the longitudinal bore.

6. The device of claim 1 wherein each protrusion of the plurality of second protrusions includes an opposed pair of channels of the plurality of second channels.

7. The device of claim 1 further comprising:
a second anti-back drive device configured to be mechanically coupled to the first anti-back drive device, including:
a plurality of third protrusions;
a plurality of fourth protrusions;
a plurality of holes, each of the plurality of holes extending through a respective one of the plurality of third protrusions;
a plurality of springs, each of the plurality of springs extending through a respective one of the plurality of holes; and
a plurality of rollers received in a plurality of cavities between respective ones of the plurality of third protrusions and the plurality of fourth protrusions, each spring of the plurality of springs being adjacent to at least one roller of the plurality of rollers.

8. A system, comprising:
a first device coupled to an output of a hand wheel of an actuator, including:
a first body;
a plurality of first protrusions extending from the first body with a space between adjacent ones of the plurality of first protrusions;
a second body;
a plurality of second protrusions extending from the second body, each of the plurality of second protrusions received in the space between adjacent ones of the plurality of first protrusions;
a plurality of first cavities between ones of the plurality of first protrusions and respective ones the plurality of second protrusions;
a plurality of first springs; and a plurality of first rollers, each of the plurality of first rollers in a respective one of the plurality of first cavities proximate to one of the plurality of first springs; and a second device coupled to an output of a motor of the actuator and mechanically coupled to the first device.

9. The system of claim 8 wherein the second device further includes:

a plurality of third protrusions;

a plurality of fourth protrusions;

a plurality of second cavities between ones of the plurality of third protrusions and respective ones of the plurality of fourth protrusions; and a plurality of holes, each of the plurality of holes extending through a respective one of the plurality of third protrusions.

10. The system of claim 9 wherein the second device further includes:

a plurality of second springs, each of the plurality of second springs extending through a respective one of the plurality of holes; and a plurality of second rollers received in the plurality of second cavities, each spring of the plurality of second springs associated with at least one roller of the plurality of second rollers.

11. The system of claim 10 wherein the plurality of first springs is arranged substantially parallel to the plurality of first rollers and wherein the plurality of second springs is transverse to the plurality of second rollers.

12. The system of claim 8 wherein the first device further includes:

a ridge extending from the first body and having an outer peripheral edge, each of the plurality of first protrusions extending beyond the outer peripheral edge of the ridge.

13. The system of claim 8 wherein the second device further includes:

a plurality of second springs; and a plurality of second rollers that is transverse to the plurality of second springs.

14. The system of claim 8 wherein the each of the plurality of first springs are in the respective one of the plurality of first cavities and are aligned with the plurality of first rollers.

15. The system of claim 8 further comprising:

a plurality of holes through the plurality of first protrusions of the first device, the plurality of first springs of the first device received in a respective one of the plurality of holes.

16. The device of claim 15 wherein the second device includes:

a plurality of second cavities;

a plurality of second springs, at least one spring of the plurality of second springs in respective ones of the plurality of second cavities; and a plurality of second rollers, at least one roller of the plurality of second rollers in respective ones of the plurality of second cavities proximate a corresponding one of the plurality of second springs.

17. A system, comprising:

a first anti-back drive component coupled to an output of a first drive device, including:

a locking component having a first body and a plurality of first flanges extending from the first body, each flange of the plurality of first flanges including an opposed pair of first channels;

an unlocking component coupled to the locking component and having a second body with a plurality of second flanges extending from the second body, each flange of the plurality of second flanges including an opposed pair of second channels, each flange of the plurality of second flanges in a space between respective ones of the plurality of first flanges;

a plurality of first recesses between the opposed pairs of first channels and the opposed pairs of second channels;

a plurality of first springs; and a plurality of first rollers, at least one roller of the plurality of first rollers in each of the plurality of first recesses; and a second anti-back drive component coupled to an output of a second drive device and mechanically coupled to the first anti-back drive component.

18. The system of claim 17 wherein a spring of the plurality of first springs is in each of the plurality of first recesses with a corresponding roller of the plurality of first rollers.

19. The system of claim 17, wherein the second anti-back drive component includes:

a third body having a plurality of third protrusions extending from the third body with a space between adjacent ones of the plurality of third protrusions, the first body further including at least one second recess in each of the plurality of third protrusions;

a fourth body coupled to the third body and having a plurality of fourth protrusions extending from the fourth body, each of the plurality of fourth protrusions in the space between adjacent ones of the plurality of third protrusions and including at least one third recess;

a plurality of cavities, each of the plurality of cavities including at least one second recess of the plurality of third protrusions and a respective at least one third recess of the plurality of fourth protrusions;

a plurality of holes through the plurality of third protrusions;

a plurality of second springs, each of the plurality of second springs in a respective one of the plurality of holes; and a plurality of second rollers in the plurality of cavities.

20. The device of claim 19 wherein each of the plurality of second springs is coupled to two of the plurality of the second rollers, the plurality of second springs being transverse to the plurality of second rollers.

* * * * *